United States Patent
Maeda

(10) Patent No.: US 12,535,632 B2
(45) Date of Patent: Jan. 27, 2026

(54) PHASE DIFFERENCE PLATE, CIRCULARLY POLARIZING PLATE, AND IMAGE DISPLAY APPARATUS

(71) Applicant: FUJIFILM Corporation, Tokyo (JP)

(72) Inventor: Yoshinori Maeda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 628 days.

(21) Appl. No.: 17/952,943

(22) Filed: Sep. 26, 2022

(65) Prior Publication Data

US 2023/0107496 A1    Apr. 6, 2023

(30) Foreign Application Priority Data

Sep. 29, 2021    (JP) .................................. 2021-159464

(51) Int. Cl.
   *G02B 5/30*    (2006.01)
(52) U.S. Cl.
   CPC .......... *G02B 5/3083* (2013.01); *G02B 5/3016* (2013.01)
(58) Field of Classification Search
   CPC . G02B 5/3083; G02B 5/3016; G02F 1/13363; G02F 1/133636; G02F 1/133541; G02F 2413/15; G02F 2413/13
   See application file for complete search history.

(56) References Cited

U.S. PATENT DOCUMENTS

| | | |
|---|---|---|
| 2014/0284583 A1 | 9/2014 | Saitoh et al. |
| 2015/0293407 A1 | 10/2015 | Iida et al. |
| 2016/0011352 A1* | 1/2016 | Saitoh ................ H10K 59/8791 349/194 |
| 2021/0294013 A1 | 9/2021 | Ota et al. |

FOREIGN PATENT DOCUMENTS

| | | |
|---|---|---|
| JP | 3174367 B2 | 6/2001 |
| JP | 2003-215341 A | 7/2003 |
| JP | 2014-209219 A | 11/2014 |
| JP | 2015-111236 A | 6/2015 |
| WO | 2010/074166 A1 | 7/2010 |
| WO | 2014/157079 A1 | 10/2014 |
| WO | 2020/036101 A1 | 2/2020 |
| WO | 2020/054720 A1 | 3/2020 |

OTHER PUBLICATIONS

Office Action which was issued by the Japanese Patent Office on Feb. 4, 2025, in connection with Japanese Patent Application No. 2021-159464.

* cited by examiner

*Primary Examiner* — Angela M. Medich
(74) *Attorney, Agent, or Firm* — Edwards Neils LLC; Jean C. Edwards, Esq.

(57) ABSTRACT

Provided is a phase difference plate including a polymer film, which achieves a small difference in tint between a front direction and an oblique direction of an obtained image display apparatus in a case where the phase difference plate is combined with a polarizer and then applied to an image display element as a circularly polarizing plate. The phase difference plate includes a first and a second optically anisotropic layer, in which the first layer is a polymer film, an in-plane retardation of the first layer at a wavelength of 550 nm is 60 to 300 nm, a thickness direction retardation of the first layer at a wavelength of 550 nm is −150 to −30 nm, the second layer is a layer formed by fixing a liquid crystal compound twist-aligned with a thickness direction as a helical axis, and the second layer satisfies a predetermined relationship with respect to $\Delta nd$.

17 Claims, 14 Drawing Sheets

PHASE DIFFERENCE PLATE, CIRCULARLY POLARIZING PLATE, AND IMAGE DISPLAY APPARATUS

CROSS-REFERENCE TO RELATED APPLICATIONS

The present application claims priority under 35 U.S.C. § 119 to Japanese Patent Application No. 2021-159464, filed on Sep. 29, 2021. The above application is hereby expressly incorporated by reference, in its entirety, into the present application.

BACKGROUND OF THE INVENTION

1. Field of the Invention

The present invention relates to a phase difference plate, a circularly polarizing plate, and an image display apparatus.

2. Description of the Related Art

An optically anisotropic layer (phase difference plate) having a phase difference is used in many applications. For example, since an organic electroluminescence (EL) display device has a structure using a metal electrode, it may reflect external light, causing problems of low contrast and reflected glare. Therefore, conventionally, a circularly polarizing plate composed of a phase difference plate and a polarizer has been used in order to suppress the influence of external light reflection.

SUMMARY OF THE INVENTION

JP3174367B discloses a phase difference plate having a plurality of liquid crystal layers.

However, in a case of forming a phase difference plate including a plurality of liquid crystal layers, a composition containing a liquid crystal compound is often applied at least twice and therefore it is not always industrially desirable to apply a large number of times. In addition, the handleability of the phase difference plate itself having a plurality of liquid crystal layers is not always favorable. From such a viewpoint, it has been desired to provide a phase difference plate including a polymer film.

In addition, in a case where a phase difference plate and a polarizer are combined and then applied to an image display element as a circularly polarizing plate, it is required that a difference in tint between a front direction and an oblique direction of an obtained image display apparatus is small.

Therefore, an object of the present invention is to provide a phase difference plate including a polymer film, which achieves a small difference in tint between a front direction and an oblique direction of an obtained image display apparatus in a case where the phase difference plate is combined with a polarizer and then applied to an image display element as a circularly polarizing plate.

Another object of the present invention is to provide a circularly polarizing plate and an image display apparatus.

As a result of extensive studies to achieve the foregoing objects, the present inventors have found that the foregoing objects can be achieved by the following configurations.

[1] A phase difference plate including a first optically anisotropic layer and a second optically anisotropic layer, in which the first optically anisotropic layer is a polymer film, an in-plane retardation of the first optically anisotropic layer at a wavelength of 550 nm is 60 to 300 n, a thickness direction retardation of the first optically anisotropic layer at a wavelength of 550 nm is −150 to −30 nm, the second optically anisotropic layer is a layer formed by fixing a liquid crystal compound twist-aligned with a thickness direction as a helical axis, and the second optically anisotropic layer satisfies a relationship of Expression (1) which will be described later.

[2] The phase difference plate according to [1], further including a photo-alignment film between the first optically anisotropic layer and the second optically anisotropic layer.

[3] The phase difference plate according to [1] or [2], in which the polymer film contains a polymer having at least one selected from the group consisting of a repeating unit derived from a styrene derivative and a repeating unit having a fluorene structure.

[4] The phase difference plate according to any one of [1] to [3], in which the liquid crystal compound exhibits liquid crystallinity at 50° C.

[5] The phase difference plate according to any one of [1] to [4], in which a glass transition temperature of the first optically anisotropic layer is 110° C. or higher.

[6] The phase difference plate according to any one of [1] to [5], in which an in-plane slow axis of the first optically anisotropic layer is parallel to an in-plane slow axis on a surface of the second optically anisotropic layer on a first optically anisotropic layer side, the in-plane retardation of the first optically anisotropic layer at a wavelength of 550 nm is 151 to 211 nm, a twisted angle of the liquid crystal compound in the second optically anisotropic layer is within a range of 81°±10°, and the second optically anisotropic layer satisfies a relationship of Expression (1-A) which will be described later.

[7] The phase difference plate according to any one of [1] to [5], in which an in-plane slow axis of the first optically anisotropic layer is orthogonal to an in-plane slow axis on a surface of the second optically anisotropic layer on a first optically anisotropic layer side, a twisted angle of the second optically anisotropic layer is within a range of 59°±10°, the in-plane retardation of the first optically anisotropic layer at a wavelength of 550 un is 158 to 218 un, and the second optically anisotropic layer satisfies a relationship of Expression (1-B) which will be described later.

[8] The phase difference plate according to any one of [1] to [5], in which an angle formed by an in-plane slow axis of the first optically anisotropic layer and an in-plane slow axis on a surface of the second optically anisotropic layer on a first optically anisotropic layer side is within a range of 30° to 70°, a twisted angle of the second optically anisotropic layer is within a range of 40°±20°, the in-plane retardation of the first optically anisotropic layer at a wavelength of 550 nm is 67.5 to 127.5 nm, and the second optically anisotropic layer satisfies a relationship of Expression (1-C) which will be described later.

[9] The phase difference plate according to any one of [1] to [8], further including a third optically anisotropic layer having a thickness direction retardation of −100 to −35 nm at a wavelength of 550 nm.

[10] A circularly polarizing plate including the phase difference plate according to any one of [1] to [9] and a polarizer.

[11] An image display apparatus including the phase difference plate according to any one of [1] to [9] or the circularly polarizing plate according to [10].

According to an aspect of the present invention, it is possible to provide a phase difference plate including a polymer film, which achieves a small difference in tint between a front direction and an oblique direction of an obtained image display apparatus in a case where the phase difference plate is combined with a polarizer and then applied to an image display element as a circularly polarizing plate.

According to another aspect of the present invention, it is possible to provide a circularly polarizing plate and an image display apparatus.

DESCRIPTION OF THE PREFERRED EMBODIMENTS

Figure 1:
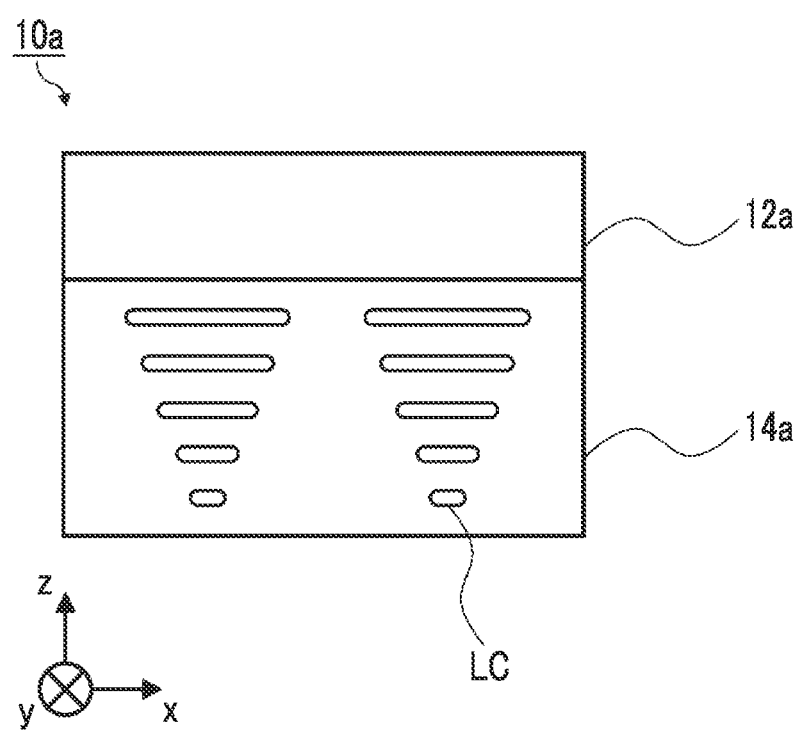
FIG. 1 is an example of a schematic cross-sectional view of a first embodiment of a phase difference plate of the present invention.

Hereinafter, the present invention will be described in more detail.

The description of the configuration requirements described below may be made based on the representative embodiments of the present invention, but the present invention is not limited to such embodiments.

Hereinafter, the meaning of each description in the present specification will be expressed.

Any numerical range expressed using "to" in the present specification refers to a range including the numerical values before and after the "to" as a lower limit value and an upper limit value, respectively.

In the present specification, the in-plane slow axis is defined at 550 nm unless otherwise specified.

In the present specification, the "orthogonal" and "parallel" is intended to include a range of errors acceptable in the art to which the present invention pertains. Specifically, it means that an angle is within an error range of ±10° with respect to the exact angle, and the error with respect to the exact angle is preferably within a range of ±5° and more preferably within a range of ±3°.

In the present specification, Re ($\lambda$) and Rth ($\lambda$) represent an in-plane retardation and a thickness direction retardation at a wavelength $\lambda$, respectively. Unless otherwise specified, the wavelength $\lambda$ is 550 nm.

In the present specification, Re ($\lambda$) and Rth ($\lambda$) are values measured at a wavelength $\lambda$ in AxoScan (manufactured by Axometrics, Inc.). Re ($\lambda$) and Rth ($\lambda$) are calculated by inputting an average refractive index ((nx+ny+nz)/3) and a film thickness (d (µm)) in AxoScan.

Slow axis direction (°)

$Re(\lambda)=R0(\lambda)$ $Rth(\lambda)=((nx+ny)/2-nz)\times d$

Although R0 ($\lambda$) is displayed as a numerical value calculated by AxoScan, it means Re ($\lambda$).

The feature point of the phase difference plate according to the embodiment of the present invention is that the phase difference plate satisfies the following two requirements.

Requirement 1: The first optically anisotropic layer is a polymer film, an in-plane retardation of the first optically anisotropic layer at a wavelength of 550 nm is 60 to 300 nm, and a thickness direction retardation of the first optically anisotropic layer at a wavelength of 550 nm is −150 to −30 nm.

Requirement 2: The second optically anisotropic layer is a layer formed by fixing a liquid crystal compound twist-aligned with a thickness direction as a helical axis, and the second optically anisotropic layer satisfies a relationship of Expression (1) which will be described later.

In a case where the phase difference plate satisfies the above two requirements, a difference in tint between a front direction and an oblique direction of an obtained image display apparatus is small in a case where the phase difference plate is applied to an image display element as a circularly polarizing plate. Hereinafter, "a difference in tint between a front direction and an oblique direction of an obtained image display apparatus is small in a case where the phase difference plate is applied to an image display element as a circularly polarizing plate" is also referred to as "the effect of the present invention is more excellent".

The phase difference plate according to the embodiment of the present invention is a phase difference plate including a first optically anisotropic layer and a second optically anisotropic layer, in which the first optically anisotropic layer is a polymer film, an in-plane retardation of the first optically anisotropic layer at a wavelength of 550 nm is 60 to 300 nm, a thickness direction retardation of the first optically anisotropic layer at a wavelength of 550 nm is −150 to −30 nm, the second optically anisotropic layer is a layer formed by fixing a liquid crystal compound twist-aligned with a thickness direction as a helical axis, and the second optically anisotropic layer satisfies a relationship of Expression (1).

$$100 \text{ nm} \leq \Delta nd \leq 380 \text{ nm} \qquad \text{Expression (1)}$$

In Expression (1), $\Delta n$ represents a refractive index anisotropy of the second optically anisotropic layer at a wavelength of 550 nm, and d represents a thickness of the second optically anisotropic layer.

Hereinafter, the phase difference plate according to the embodiment of the present invention will be described based on the first embodiment to the third embodiment of the present invention.

First Embodiment

Hereinafter, the first embodiment of the phase difference plate according to the embodiment of the present invention will be described with reference to the accompanying drawings. FIG. 1 shows a schematic cross-sectional view of the first embodiment of the phase difference plate according to the embodiment of the present invention.

A phase difference plate 10a has a first optically anisotropic layer 12a and a second optically anisotropic layer 14a. The first optically anisotropic layer 12a is a polymer film, and the second optically anisotropic layer 14a is a layer formed of a rod-like liquid crystal compound LC. In particular, the second optically anisotropic layer 14a is a layer formed by fixing a twist-aligned liquid crystal compound with a thickness direction as a helical axis.

FIG. 1 shows an example in which a rod-like liquid crystal compound is used as the liquid crystal compound, but as will be described later, the liquid crystal compound is not limited to the rod-like liquid crystal compound.

Hereinafter, the first optically anisotropic layer 12a and the second optically anisotropic layer 14a will be described.

First Optically Anisotropic Layer 12a

The first optically anisotropic layer 12a is a polymer film.

The polymer film is a film mainly composed of a polymer, and is preferably a stretched polymer film from the viewpoint that it is easy to show a predetermined retardation which will be described later. The stretched polymer film is a polymer film that has been subjected to a stretch treatment.

The material constituting the polymer film is not particularly limited as long as it satisfies the predetermined retardation which will be described later.

The polymer film is a member exhibiting birefringent properties in order to exhibit in-plane retardation. Such a polymer film is generally produced by stretching a polymer, but due to the difference in optical expression in a case where the polymer is stretched, the polymer constituting the polymer film is classified into a polymer having a positive intrinsic birefringence and a polymer having a negative intrinsic birefringence. The polymer having a positive intrinsic birefringence is a polymer having a slow axis in a stretching direction. In other words, the polymer having a positive intrinsic birefringence is a polymer in which the refractive index in a stretching direction is larger than the refractive index in a direction orthogonal to the stretching direction. In addition, the polymer having a negative intrinsic birefringence is a polymer having a slow axis in a direction orthogonal to a stretching direction. In other words, the polymer having a negative intrinsic birefringence is a polymer in which the refractive index in a stretching direction is smaller than the refractive index in a direction orthogonal to the stretching direction.

The intrinsic birefringence of the polymer constituting the polymer film may be positive or negative, and the intrinsic birefringence of the polymer constituting the polymer film is preferably negative.

Examples of the polymer having a positive intrinsic birefringence include polyolefins such as polyethylene and polypropylene; polyesters such as polyethylene terephthalate and polybutylene terephthalate; polyarylene sulfides such as polyphenylene sulfide; polyvinyl alcohols; polycarbonates; polyallylates; cellulose ester polymers such as cellulose acylate; polyether sulfones; polysulfones; polyallyl sulfones; polyvinyl chlorides; cyclic olefin polymers such as norbornene polymer; and rod-like liquid crystal polymers. In addition, the polymer may be a homopolymer or a copolymer.

Examples of the polymer having a negative intrinsic birefringence include polystyrene-based polymers including a homopolymer of styrene or a styrene derivative (for example, polystyrene or fluoropolystyrene) and a copolymer of styrene or a styrene derivative and any monomer; polyacrylonitrile polymers; (meth)acrylic polymers such as polymethyl methacrylate; polyester-based resins; multi-component copolymers thereof; and cellulose compounds such as cellulose ester. More specific examples of the polymer having a negative intrinsic birefringence include polymethyl methacrylate, polystyrene, fluoropolystyrene, polyvinyl naphthalene, and fumaric acid ester-based resin.

Examples of the styrene derivative include a monomer in which one or more hydrogen atoms of the ethenyl group of styrene are substituted with a substituent, and a monomer in which one or more hydrogen atoms of the phenyl group of styrene are substituted with a substituent. Examples of the substituent include an alkyl group, a halogen atom, an alkoxy group, an acetoxy group, an amino group, a nitro group, a cyano group, an aryl group, a hydroxyl group, and a carbonyl group. The number of substituents may be one or two or more. Further, the substituent may or may not have a substituent.

In addition, the styrene derivative may be one in which a phenyl group and another aromatic ring are condensed, or may be an indene or indane whose substituent forms a ring other than a phenyl group, or may have a structure having a crosslinked ring.

Other examples of the polymer having a negative intrinsic birefringence include a polymer containing a repeating unit having a fluorene structure. For example, a polymer containing a repeating unit having a fluorene-9,9-diyl structure can be mentioned.

In the present invention, any polymer film can be used, but a polymer film containing a polymer having a negative intrinsic birefringence is preferable. Above all, a polymer having at least one selected from the group consisting of a repeating unit derived from a styrene derivative and a repeating unit having a fluorene structure is preferable.

The styrene derivative is preferably one in which the hydrogen atom of the ethenyl group of styrene is substituted with a halogen atom.

The stereoregularity of the resin having a structure derived from styrene or a structure derived from a styrene derivative as a repeating unit is not particularly limited, and may be any of isotactic, syndiotactic, and atactic. Above all, the stereoregularity of the resin is preferably syndiotactic.

In addition, the polymer film may contain two or more types of polymers.

As described above, the polymer film is preferably a stretched polymer film (stretched film), and more preferably a stretched polymer film containing a polymer having a negative intrinsic birefringence.

From the viewpoint that the effect of the present invention is more excellent, the content of the polymer having a negative intrinsic birefringence in the polymer film is preferably 50% to 100% by mass and more preferably 75% to 100% by mass with respect to the total mass of the polymer film.

In addition, the glass transition temperature (Tg) of the polymer film constituting the first optically anisotropic layer 12a is preferably 110° C. or higher. In a case where the Tg is 110° C. or higher, wrinkling during production of the phase difference plate can be suppressed. The upper limit of the Tg is not particularly limited, and is preferably 180° C. or lower.

As described above, the in-plane retardation of the first optically anisotropic layer 12a at a wavelength of 550 nm is 60 to 300 nm. The in-plane retardation of the first optically anisotropic layer 12a at a wavelength of 550 nm is preferably 90 to 230 nm and more preferably 151 to 211 nm from the viewpoint that the effect of the present invention is more excellent.

In addition, as described above, the thickness direction retardation of the first optically anisotropic layer 12a at a wavelength of 550 nm is −150 to −30 nm. The thickness direction retardation of the first optically anisotropic layer 12a at a wavelength of 550 nm is preferably −115 to −45 nm and more preferably −109 to −75 mm from the viewpoint that the effect of the present invention is more excellent.

The in-plane slow axis of the first optically anisotropic layer 12a is parallel to the in-plane slow axis on the surface of the second optically anisotropic layer 14a on a first optically anisotropic layer 12a side.

The thickness of the first optically anisotropic layer 12a is not particularly limited, and is preferably 1 to 100 μm, more preferably 10 to 70 μm, and still more preferably 20 to 50 μm.

Second Optically Anisotropic Layer 14a

As shown in FIG. 1, the second optically anisotropic layer 14a is a layer formed by fixing a twist-aligned rod-like liquid crystal compound LC with a thickness direction (z-axis direction in FIG. 1) as a helical axis.

The phrase "the liquid crystal compound is twist-aligned" is intended to mean that the liquid crystal compound from one main surface to the other main surface of the second optically anisotropic layer 14a is twisted about the thickness direction of the second optically anisotropic layer 14a. Along with this, the alignment direction (that is, in-plane slow axis direction) of the liquid crystal compound differs depending on the position of the second optically anisotropic layer 14a in a thickness direction.

The "fixed" state is a state in which the alignment of the liquid crystal compound is maintained. Specifically, the "fixed" state is preferably a state in which, in a temperature range of usually 0° C. to 50° C. or in a temperature range of −30° C. to 70° C. under more severe conditions, the layer has no fluidity and a fixed alignment morphology can be maintained stably without causing a change in the alignment morphology due to an external field or an external force.

The liquid crystal compound contained in the second optically anisotropic layer 14a is not limited to the rod-like liquid crystal compound as in the example shown in FIG. 1.

The liquid crystal compound may be any compound exhibiting liquid crystallinity, and the type of the liquid crystal compound is not particularly limited. Generally, the liquid crystal compound can be classified into a rod-like type (rod-like liquid crystal compound) and a disk-like type (discotic liquid crystal compound) depending on the shape thereof. Further, the liquid crystal compound can be classified into a low molecular weight type and a high molecular weight type. The high molecular weight generally refers to having a polymerization degree of 100 or more (Polymer Physics-Phase Transition Dynamics, Masao Doi, p. 2, Iwanami Shoten Publishers, 1992). Any liquid crystal compound can be used in the present invention, and it is preferable to use a rod-like liquid crystal compound or a discotic liquid crystal compound and it is more preferable to use a rod-like liquid crystal compound. Two or more rod-like liquid crystal compounds, two or more discotic liquid crystal compounds, or a mixture of a rod-like liquid crystal compound and a discotic liquid crystal compound may be used.

For example, rod-like liquid crystal compounds described in claim 1 of JP1999-513019A (JP-H11-513019A) and paragraphs [0026] to [0098] of JP2005-289980A can be preferably used as the rod-like liquid crystal compound.

For example, discotic liquid crystal compounds described in paragraphs [0020] to [0067] of JP2007-108732A and paragraphs [0013] to [0108] of JP2010-244038A can be preferably used as the discotic liquid crystal compound.

In addition, the liquid crystal compound may have a polymerizable group. In a case where the liquid crystal compound has a polymerizable group, the alignment of the liquid crystal compound can be fixed by polymerizing the liquid crystal compounds with each other or polymerizing the liquid crystal compound with another compound through the polymerizable group. The liquid crystal compound having a polymerizable group is also referred to as a polymerizable liquid crystal compound.

The polymerizable group is not particularly limited, and is preferably a functional group capable of an addition polymerization reaction, more preferably a polymerizable ethylenic unsaturated group or a ring-polymerizable group, and still more preferably a (meth)acryloyl group, a vinyl group, a styryl group, or an allyl group.

After the liquid crystal compound is fixed by polymerization or the like to form the second optically anisotropic layer 14a, the liquid crystal compound no longer needs to exhibit liquid crystallinity.

The liquid crystal compound preferably exhibits liquid crystallinity at 50° C. Two or more types of the liquid crystal compounds may be used, and in a case where two or more types of the liquid crystal compounds are used, it is preferable that a mixture of the liquid crystal compounds exhibits liquid crystallinity at 50° C.

The second optically anisotropic layer 14a may contain a chiral agent.

The chiral agent refers to a compound capable of inducing a twisted alignment of a liquid crystal compound. The ability of the chiral agent to induce twisted alignment (helical twisting power) may or may not change upon irradiation with light. In addition, the direction of the helical twisting power is not particularly limited.

In addition, the chiral agent may or may not exhibit liquid crystallinity.

The chiral agent whose helical twisting power changes upon irradiation with light (photoreactive chiral agent) may be, for example, a compound which has a chiral site and a photoreactive site that undergoes a structural change upon irradiation with light, examples of which include a compound which greatly changes a twisting power of a liquid crystal compound in response to an irradiation amount. Examples of the photoreactive site that undergoes a structural change upon irradiation with light include photochromic compounds (Kingo Uchida and Masahiro Irie, "Chemical Industry", Vol. 64, p. 640, 1999; and Kingo Uchida and Masahiro Irie, "Fine Chemicals", Vol. 28(9), p. 15, 1999). In addition, the structural change means decomposition, addition reaction, isomerization, racemization, [2+2] photocyclization, dimerization reaction, or the like occurred upon irradiation of a photoreactive site with light, and the structural change may be irreversible. In addition, the chiral site corresponds to the asymmetric carbon described in Chemistry of Liquid Crystals, No. 22, Hiroyuki Nohira, Chemical Reviews, p. 73, 1994.

Two or more types of the above-mentioned chiral agents may be used at the same time, and a photoreactive chiral agent and a non-photoreactive chiral agent may be used in combination.

The twisted angle of the liquid crystal compound is preferably within a range of 810°±10° (71° to 91°) and from the viewpoint that the effect of the present invention is more excellent, the twisted angle of the liquid crystal compound is more preferably within a range of 81°±6° (75° to 87°).

There are two types of twisted directions, but it does not matter whether the twisted direction is clockwise or counterclockwise. That is, with regard to the twisted angle, in a case where a twisted angle is within a range of 81°±10°, it refers to both a case of twisting within a range of 81°±10° clockwise and a case of twisting within a range of 81°±10° counterclockwise.

The twisted angle is measured using an AxoScan (polarimeter) device manufactured by Axometrics, Inc. and using device analysis software attached thereto.

In addition, the second optically anisotropic layer 14a preferably satisfies the relationship of Expression (1-A).

$$142 \text{ nm} \leq \Delta nd \leq 202 \text{ nm} \qquad \text{Expression (1-A)}$$

In Expression (1-A), $\Delta n$ represents the refractive index anisotropy of the second optically anisotropic layer 14a at a wavelength of 550 nm.

In Expression (1-A), d represents the film thickness (nm) of the second optically anisotropic layer 14a.

The second optically anisotropic layer 14a more preferably satisfies the relationship of Expression (1-A1) and still more preferably satisfies the relationship of Expression (1-A2).

$$151 \text{ nm} \leq \Delta nd \leq 202 \text{ nm} \qquad \text{Expression (1-A1)}$$

$$151 \text{ nm} \leq \Delta nd \leq 196 \text{ nm} \qquad \text{Expression (1-A2)}$$

The $\Delta nd$ can be adjusted by the type of the liquid crystal compound, the twisted angle, and the film thickness of the second optically anisotropic layer 14a.

The $\Delta nd$ is measured using an AxoScan (polarimeter) device manufactured by Axometrics, Inc. and using device analysis software attached thereto, in the same manner as the method for measuring the twisted angle.

The thickness of the second optically anisotropic layer 14a is not particularly limited, and is preferably 0.1 to 10.0 μm, more preferably 1.0 to 5.0 μm, and still more preferably 1.0 to 2.5 μm.

The first embodiment of the phase difference plate according to the embodiment of the present invention includes at least the first optically anisotropic layer 12a and the second optically anisotropic layer 14a described above, and may include other members.

Other Members

The first embodiment of the phase difference plate according to the embodiment of the present invention may further include a third optically anisotropic layer.

A layer having a thickness direction retardation is preferable as the third optically anisotropic layer. An optically anisotropic layer showing a negative thickness direction retardation (Rth) is preferable, that is, a so-called positive C-plate is preferable.

The thickness direction retardation (Rth) of the third optically anisotropic layer at a wavelength of 550 nm is preferably −200 to −30 nm, more preferably −150 to −35 nm, and still more preferably −100 to −35 nm from the viewpoint that the effect of the present invention is more excellent.

The first embodiment of the phase difference plate according to the embodiment of the present invention may further include an alignment film. In particular, an alignment film may be included between the first optically anisotropic layer and the second optically anisotropic layer.

The alignment film can be formed by means such as rubbing treatment of an organic compound (preferably a polymer), oblique vapor deposition of an inorganic compound, formation of a layer having microgrooves, or accumulation of an organic compound (for example, ω-tricosanoic acid, dioctadecylmethylammonium chloride, or methyl stearate) by the Langmuir-Blodgett method (LB film).

In addition, there is also known an alignment film capable of expressing an alignment function by application of an electric field, application of a magnetic field, or light (preferably polarized light) irradiation.

Examples of the alignment film include a photo-alignment film. The material that forms the photo-alignment film will be described in detail later.

The thickness of the alignment film is not particularly limited as long as it can exhibit an alignment function, and is preferably 0.01 to 5.0 μm, more preferably 0.05 to 2.0 μm, and still more preferably 0.1 to 0.5 μm.

The first embodiment of the phase difference plate according to the embodiment of the present invention may further include a substrate.

The substrate is preferably a transparent substrate. The transparent substrate is intended to refer to a substrate having a visible light transmittance of 60% or more, which preferably has a visible light transmittance of 80% or more and more preferably 90% or more.

The thickness of the substrate is not particularly limited, and is preferably 10 to 200 μm, more preferably 10 to 100 μm, and still more preferably 20 to 90 μm.

In addition, the substrate may consist of a plurality of layers laminated. In order to improve the adhesion of the substrate to the layer provided thereon, the surface of the substrate may be subjected to a surface treatment (for example, a glow discharge treatment, a corona discharge treatment, an ultraviolet (UV) treatment, or a flame treatment).

In addition, an adhesive layer (undercoat layer) may be provided on the substrate.

In addition, in order to impart slipperiness in a transport step and prevent a back surface and a front surface from sticking to each other after winding, a polymer layer in which inorganic particles having an average particle diameter of about 10 to 100 nm are mixed in a solid content mass ratio of 5% to 40% by mass may be disposed on one side of the substrate.

The substrate may be a so-called temporary support. That is, after production of the phase difference plate, the substrate may be peeled off from the phase difference plate.

Circularly Polarizing Plate

The first embodiment of the phase difference plate according to the embodiment of the present invention can be used as a circularly polarizing plate in combination with a polarizer. The circularly polarizing plate is an optical element that converts unpolarized light into circularly polarized light.

The circularly polarizing plate according to the embodiment of the present invention having the above configuration is suitably used for antireflection applications of an image display apparatus such as a liquid crystal display device (LCD), a plasma display panel (PDP), an electroluminescent display (ELD), or a cathode tube display device (CRT) to improve a contrast ratio of display light.

The polarizer may be a member having a function of converting natural light into specific linearly polarized light, and examples thereof include an absorption type polarizer.

The type of the polarizer is not particularly limited, and a commonly used polarizer can be used. Examples of the polarizer include an iodine-based polarizer, a dye-based polarizer using a dichroic substance, and a polyene-based polarizer. The iodine-based polarizer and the dye-based polarizer are generally prepared by adsorbing iodine or a dichroic dye on a polyvinyl alcohol, followed by stretching.

A protective film may be disposed on one side or both sides of the polarizer.

Figure 2:
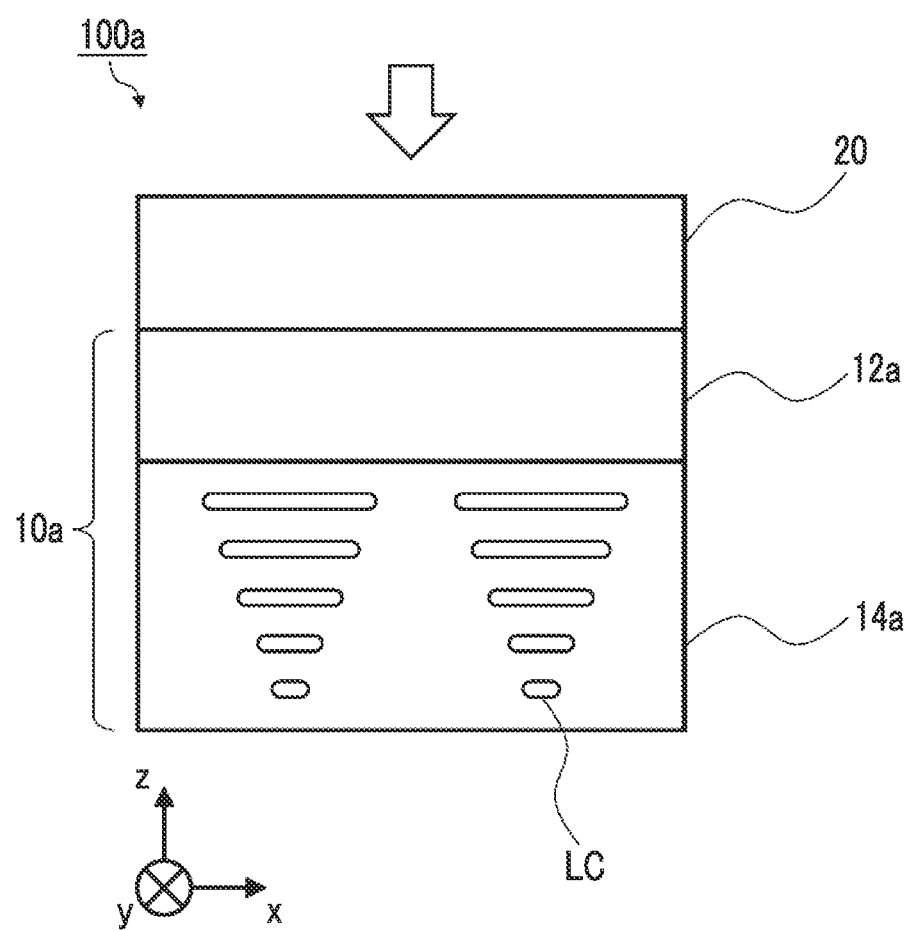
FIG. 2 is an example of a schematic cross-sectional view of a first embodiment of a circularly polarizing plate using the phase difference plate of the present invention.
Figure 3:
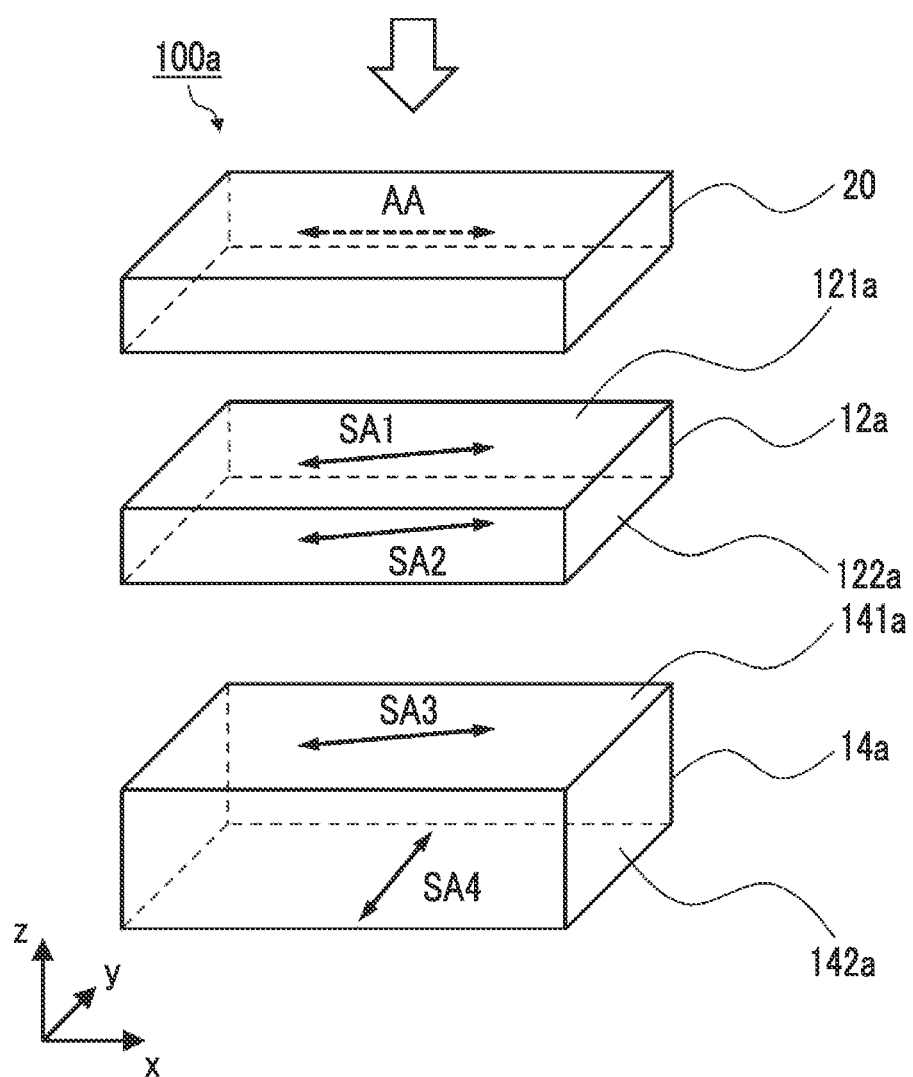
FIG. 3 is a view showing a relationship between an absorption axis of a polarizer 20 and an in-plane slow axis of each of a first optically anisotropic layer 12a and a second optically anisotropic layer 14a in one aspect of the first embodiment of the circularly polarizing plate using the phase difference plate of the present invention.
Figure 4:
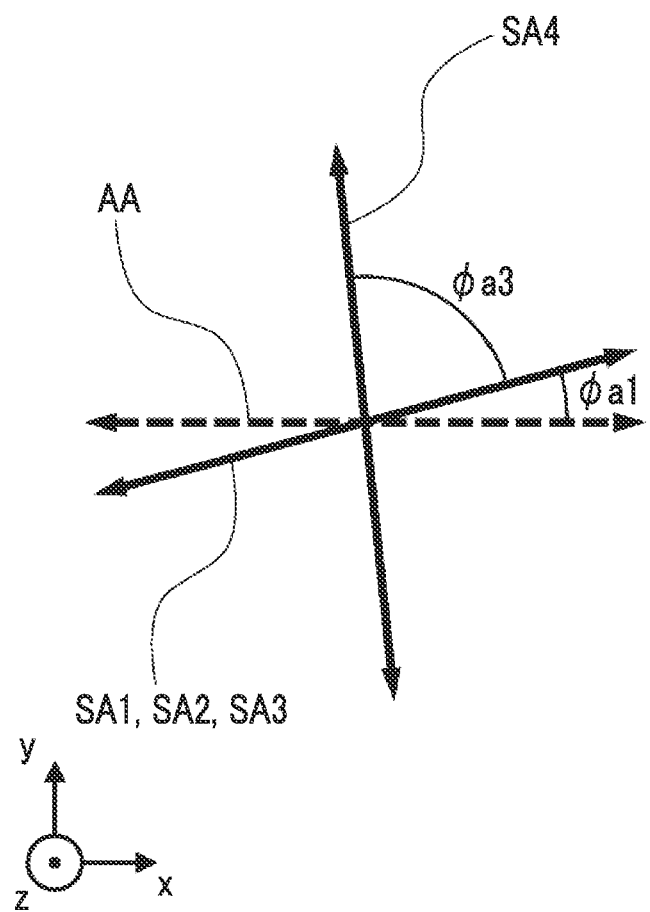
FIG. 4 is a schematic view showing a relationship of an angle between the absorption axis of the polarizer 20 and the in-plane slow axis of each of the first optically anisotropic layer 12a and the second optically anisotropic layer 14a, upon observation from the direction of a white arrow in FIG. 3.

FIG. 2 shows a schematic cross-sectional view of an embodiment of a circularly polarizing plate. In addition, FIG. 3 is a view showing the relationship among, in a circularly polarizing plate 100a shown in FIG. 2, an absorption axis AA of the polarizer 20, an in-plane slow axis SA1 on a surface 121a of the first optically anisotropic layer 12a on the polarizer 20 side, an in-plane slow axis SA2 on a surface 122a of the first optically anisotropic layer 12a on the second optically anisotropic layer 14a side, an in-plane slow axis SA3 on a surface 141a of the second optically anisotropic layer 14a on the first optically anisotropic layer 12a side, and an in-plane slow axis SA4 on a surface 142a of the second optically anisotropic layer 14a opposite to the first optically anisotropic layer 12a side. In addition, FIG. 4 is a view showing a relationship of the angle between the absorption axis AA of the polarizer 20 and the in-plane slow axis (SA1 to SA4) of each of the first optically anisotropic layer 12a and the second optically anisotropic layer 14a, upon observation from the white arrow in FIG. 2.

In FIG. 3, the arrow in the polarizer 20 indicates an absorption axis, and the arrow in the first optically anisotropic layer 12a and the second optically anisotropic layer 14a indicates an in-plane slow axis in each layer.

The rotation angle of the in-plane slow axis is represented by a positive angle value in a counterclockwise direction and a negative angle value in a clockwise direction, with reference to the absorption axis AA of the polarizer 20 (0°), upon observation from the white arrow in FIG. 2. In addition, whether the twisted direction is clockwise or counterclockwise is determined with reference to the in-plane slow axis (SA3) on the surface 141a of the front side (the polarizer 20 side) in the second optically anisotropic layer 14a, upon observation from the white arrow in FIG. 2.

As shown in FIG. 2, the circularly polarizing plate 100a includes the polarizer 20, the first optically anisotropic layer 12a, and the second optically anisotropic layer 14a in this order.

As shown in FIG. 3 and FIG. 4, an angle φa1 formed by the absorption axis AA of the polarizer 20 and the in-plane slow axis SA1 on the surface 121a of the first optically anisotropic layer 12a on the polarizer 20 side is 15°. More specifically, the in-plane slow axis SA1 on the surface 121a of the first optically anisotropic layer 12a on the polarizer 20 side is rotated by 15° (counterclockwise 15°) with respect to the absorption axis AA of the polarizer 20. In addition, although FIG. 3 and FIG. 4 show an aspect in which the in-plane slow axis SA1 on the surface 121a of the first optically anisotropic layer 12a on the polarizer 20 side is located at a position of 15° with respect to the absorption axis AA of the polarizer 20, the present invention is not limited to this aspect. The in-plane slow axis SA1 is preferably located within a range of 15°±10° with respect to the absorption axis AA. That is, the angle formed by the absorption axis AA of the polarizer 20 and the in-plane slow axis SA1 on the surface 121a of the first optically anisotropic layer 12a on the polarizer 20 side is preferably within a range of 15°±10°.

As shown in FIG. 3, in the first optically anisotropic layer 12a, the in-plane slow axis SA1 on the surface 121a of the first optically anisotropic layer 12a on the polarizer 20 side is parallel to the in-plane slow axis SA2 on the surface 122a of the first optically anisotropic layer 12a on the second optically anisotropic layer 14a side.

As shown in FIG. 3 and FIG. 4, the in-plane slow axis SA2 on the surface 122a of the first optically anisotropic layer 12a on the second optically anisotropic layer 14a side is parallel to the in-plane slow axis SA3 on the surface 141a of the second optically anisotropic layer 14a on the first optically anisotropic layer 12a side.

As described above, the second optically anisotropic layer 14a is a layer in which a twist-aligned liquid crystal compound with a thickness direction as a helical axis is fixed. Therefore, as shown in FIG. 3 and FIG. 4, the in-plane slow axis SA3 on the surface 141a of the second optically anisotropic layer 14a on the polarizer 20 side and the in-plane slow axis SA4 on the surface 142a of the second optically anisotropic layer 14a opposite to the first optically anisotropic layer 12a side form the above-mentioned twisted angle (81° in FIG. 4). That is, an angle φa3 formed by the in-plane slow axis SA3 on the surface 141a of the second optically anisotropic layer 14a on the polarizer 20 side and the in-plane slow axis SA4 on the surface 142a of the second optically anisotropic layer 14a opposite to the first optically anisotropic layer 12a side is 81°. More specifically, the in-plane slow axis of the second optically anisotropic layer 14a rotates by 81° (counterclockwise 81°). Therefore, the angle formed by the absorption axis AA of the polarizer 20 and the in-plane slow axis SA4 on the surface 142a of the second optically anisotropic layer 14a opposite to the first optically anisotropic layer 12a side is 96°.

Although FIG. 3 and FIG. 4 show an aspect in which the in-plane slow axis of the second optically anisotropic layer 14a is rotated by 81°, the present invention is not limited to this aspect. The rotation angle is preferably within a range of 81°±10°. That is, the angle formed by the in-plane slow axis SA3 on the surface 141a of the second optically anisotropic layer 14a on the polarizer 20 side and the in-plane slow axis SA4 on the surface 142a of the second optically anisotropic layer 14a opposite to the first optically anisotropic layer 12a side is preferably within a range of 81°±10°.

As described above, in the aspect of FIG. 3 and FIG. 4, the in-plane slow axis SA1 of the first optically anisotropic layer 12a is located at a position of 15° with reference to the absorption axis AA of the polarizer 20, and the twisted direction of the liquid crystal compound in the second optically anisotropic layer 14a is counterclockwise.

In FIG. 3 and FIG. 4, the aspect in which the twisted direction of the liquid crystal compound is counterclockwise is described in detail, but an aspect in which the twisted direction of the liquid crystal compound is clockwise may be configured as long as the relationship of a predetermined angle is satisfied. More specifically, it may be an aspect in which the in-plane slow axis SAL of the first optically anisotropic layer 12a is located at a position of −15° with reference to the absorption axis AA of the polarizer 20, and the twisted direction of the liquid crystal compound in the first optically anisotropic layer 12a is clockwise.

Figure 5:
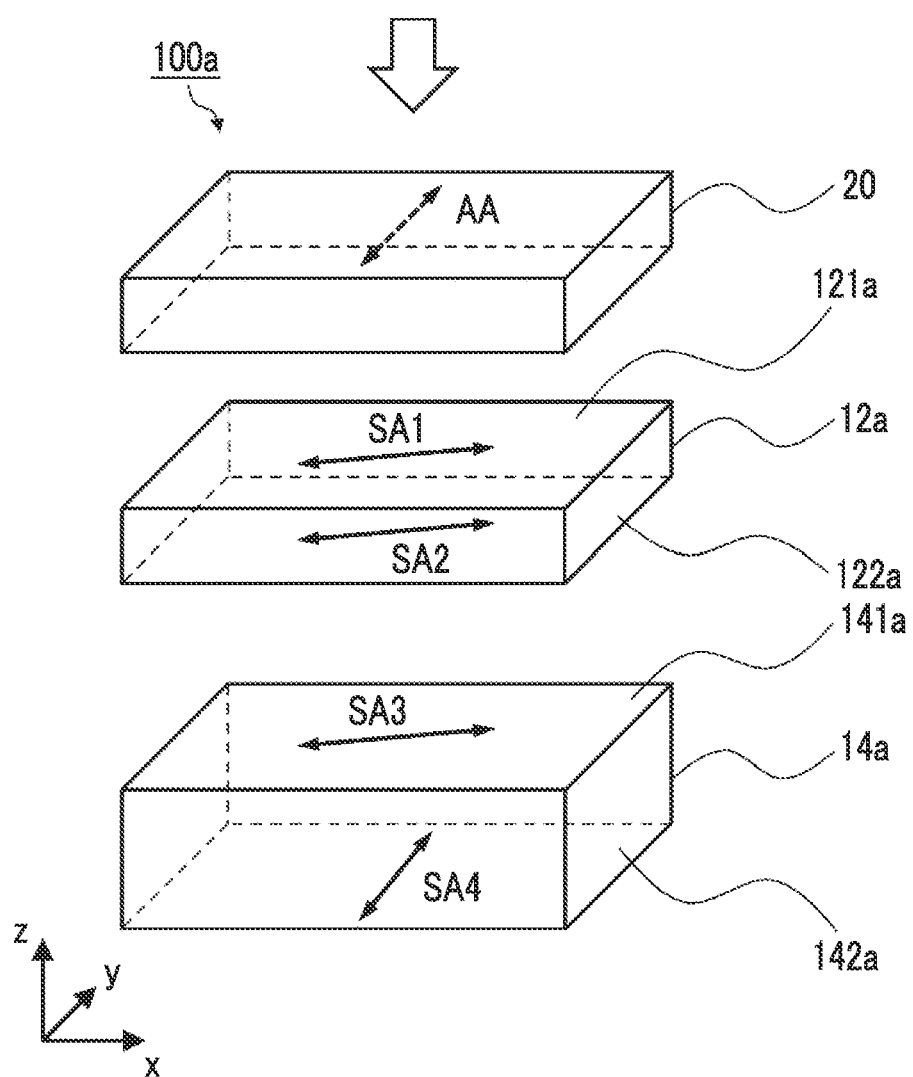
FIG. 5 is a view showing a relationship between the absorption axis of the polarizer 20 and the in-plane slow axis of each of the first optically anisotropic layer 12a and the second optically anisotropic layer 14a in one aspect of the first embodiment of the circularly polarizing plate using the phase difference plate of the present invention.
Figure 6:
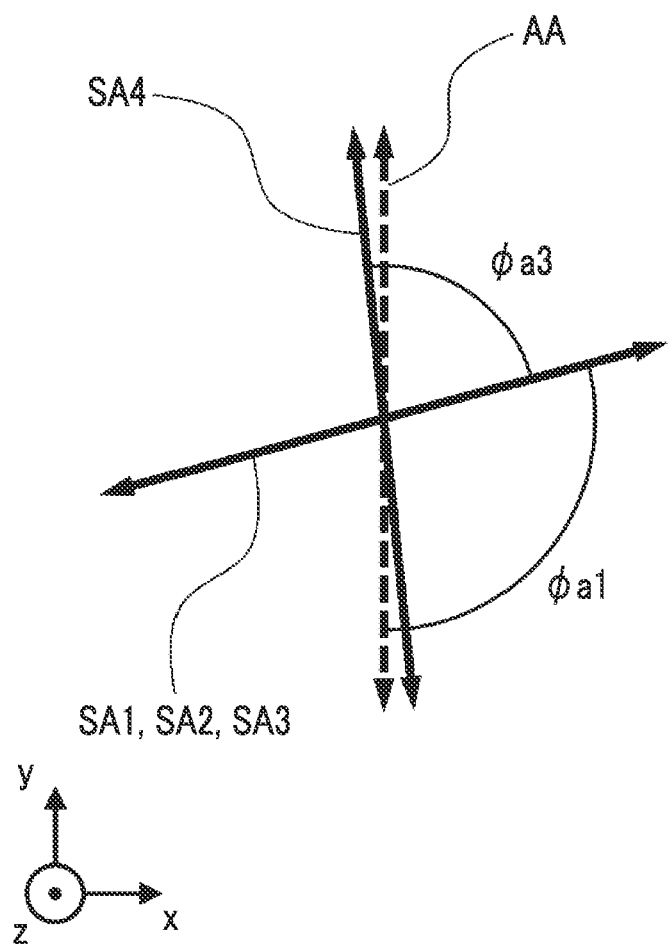
FIG. 6 is a schematic view showing a relationship of an angle between the absorption axis of the polarizer 20 and the in-plane slow axis of each of the first optically anisotropic layer 12a and the second optically anisotropic layer 14a, upon observation from the direction of a white arrow in FIG. 5.

One embodiment of the circularly polarizing plate shown in FIG. 2 has been described as described above with reference to FIG. 3 and FIG. 4, but may be an aspect shown in FIG. 5 and FIG. 6.

Similar to FIG. 3, FIG. 5 is a view showing the relationship among, in the circularly polarizing plate shown in FIG. 2, the absorption axis AA of the polarizer 20, the in-plane slow axis SA1 on the surface 121a of the first optically anisotropic layer 12a on the polarizer 20 side, the in-plane slow axis SA2 on the surface 122a of the first optically anisotropic layer 12a on the second optically anisotropic layer 14a, the in-plane slow axis SA3 on the surface 141a of the second optically anisotropic layer 14a on the first optically anisotropic layer 12a side, and the in-plane slow axis SA4 on the surface 142a of the second optically anisotropic layer 14a opposite to the first optically anisotropic layer 12a side. In addition, FIG. 6 is a view showing a relationship of the angle between the absorption axis AA of the polarizer 20 and the in-plane slow axis (SA1 to SA4) of each of the first optically anisotropic layer 12a and the second optically anisotropic layer 14a, upon observation from the white arrow in FIG. 5.

In FIG. 5, the arrow in the polarizer 20 indicates an absorption axis, and the arrow in the first optically anisotropic layer 12a and the second optically anisotropic layer 14a indicates an in-plane slow axis in each layer.

The definition of the rotation angle of the in-plane slow axis is the same as above.

The aspect shown in FIG. 5 and FIG. 6 coincides with the aspect shown in FIG. 3 and FIG. 4, in which the first optically anisotropic layer 12a and the second optically anisotropic layer 14a are fixed and the arrangement direction of the polarizer 20 is rotated by 90°.

As shown in FIG. 5 and FIG. 6, the angle φa1 formed by the absorption axis AA of the polarizer 20 and the in-plane slow axis SA1 of the first optically anisotropic layer 12a is 105°. More specifically, the in-plane slow axis SA1 on the surface 121a of the first optically anisotropic layer 12a on the polarizer 20 side is rotated by 105° (counterclockwise 105°) with respect to the absorption axis AA of the polarizer 20. Although FIG. 5 and FIG. 6 show an aspect in which the in-plane slow axis SA1 of the first optically anisotropic layer 12a is located at a position of 105°, the present invention is not limited to this aspect. The in-plane slow axis SA1 is preferably within a range of 105°±10°. That is, the angle formed by the absorption axis AA of the polarizer 20 and the in-plane slow axis SA1 on the surface 121a of the first optically anisotropic layer 12a on the polarizer 20 side is preferably within a range of 105°±10°.

As shown in FIG. 5, in the first optically anisotropic layer 12a, the in-plane slow axis SA1 on the surface 121a of the first optically anisotropic layer 12a on the polarizer 20 side is parallel to the in-plane slow axis SA2 on the surface 122a of the first optically anisotropic layer 12a on the second optically anisotropic layer 14a side.

The relationship among the in-plane slow axes SA1 and SA2 of the first optically anisotropic layer 12a, the in-plane slow axis SA3 on the surface 141a of the second optically anisotropic layer 14a on the first optically anisotropic layer 12a side, and the in-plane slow axis SA4 on the surface 142a of the second optically anisotropic layer 14a opposite to the first optically anisotropic layer 12a side in FIG. 5 and FIG. 6 is the same as the relationship shown in FIG. 3 and FIG. 4 described above, and the suitable range of angles is also the same.

The angle formed by the absorption axis AA of the polarizer 20 and the in-plane slow axis SA4 on the surface 142a of the second optically anisotropic layer 14a opposite to the first optically anisotropic layer 12a side is 186°.

As described above, in the aspect of FIG. 5 and FIG. 6, the in-plane slow axis SA1 on the surface 121a of the first optically anisotropic layer 12a on the polarizer 20 side is located at a position of 105° with reference to the absorption axis AA of the polarizer 20, and the twisted direction of the liquid crystal compound in the second optically anisotropic layer 14a is counterclockwise.

In FIG. 5 and FIG. 6, the aspect in which the twisted direction of the liquid crystal compound is counterclockwise is described in detail, but an aspect in which the twisted direction of the liquid crystal compound is clockwise may be configured as long as the relationship of a predetermined angle is satisfied. More specifically, it may be an aspect in which the in-plane slow axis SA1 on the surface 121a of the first optically anisotropic layer 12a on the polarizer 20 side is located at a position of −105° with reference to the absorption axis AA of the polarizer 20, and the twisted direction of the liquid crystal compound in the first optically anisotropic layer 12a is clockwise.

Method for Producing Phase Difference Plate

The method for producing a phase difference plate is not particularly limited, and a known method can be used.

For example, an optical film can be produced by preparing a first optically anisotropic layer and a second optically anisotropic layer each exhibiting predetermined optical properties, and bonding the optically anisotropic layers and a support in a predetermined order through an adhesion layer (for example, a pressure-sensitive adhesive layer or an adhesive layer).

In addition, a polymerizable liquid crystal composition which will be described later may be applied onto the first optically anisotropic layer to form the second optically anisotropic layer.

Hereinafter, the methods for producing the first optically anisotropic layer 12a and the second optically anisotropic layer 14a will be described in detail.

First Optically Anisotropic Layer 12a

The first optically anisotropic layer 12a is a polymer film, and is preferably formed by using the material described above. The method for producing the first optically anisotropic layer 12a is not particularly limited, and a known method can be applied. For example, the first optically anisotropic layer 12a can be produced by subjecting a film containing a predetermined resin to a stretching treatment. The stretching direction and stretching rate are not particularly limited and are appropriately selected. The direction of the in-plane slow axis of the first optically anisotropic layer 12a can be controlled by adjusting the stretching direction and stretching rate.

The first optically anisotropic layer 12a can be used as a substrate in a case of forming the second optically anisotropic layer 14a.

Second Optically Anisotropic Layer 14a

The second optically anisotropic layer 14a is a layer formed by fixing a twist-aligned liquid crystal compound, and is preferably formed of a polymerizable liquid crystal composition containing a polymerizable liquid crystal compound, a chiral agent, and other components, all of which have been described above. More specifically, it is preferable that the polymerizable liquid crystal composition is applied to form a composition layer, the liquid crystal compound in the composition layer is twist-aligned, and then a cure treatment is carried out to obtain the second optically anisotropic layer 14a. In addition, the polymerizable liquid crystal compound is preferably applied onto a photo-alignment film. The method for forming a photo-alignment film is preferably a method in which a composition for forming a photo-alignment film for forming the photo-alignment film is applied, dried, and then irradiated with ultraviolet rays by linearly polarized light.

The polymerizable liquid crystal composition is a composition containing a liquid crystal compound having a polymerizable group. Various components contained in the polymerizable liquid crystal composition will be described in detail later.

Hereinafter, the above procedure will be described in detail.

The procedure for forming a composition layer described above is not particularly limited, and examples thereof include a method in which a polymerizable liquid crystal composition is applied onto an object to be coated and, if necessary, a drying treatment is carried out.

The application method is not particularly limited, and examples thereof include a wire bar coating method, an extrusion coating method, a direct gravure coating method, a reverse gravure coating method, and a die-coating method.

The film thickness of the composition layer is not particularly limited and is preferably 0.1 to 20 μm, more preferably 0.2 to 15 μm, and still more preferably 0.5 to 10 μm.

Next, the formed composition layer is subjected to an alignment treatment to align a polymerizable liquid crystal compound in the composition layer. The liquid crystal compound can be twist-aligned by including a chiral agent in the composition layer.

The alignment treatment can be carried out by drying the coating film at room temperature or by heating the coating film. Ina case of a thermotropic liquid crystal compound, the liquid crystal phase formed by the alignment treatment can generally be transferred by a change in temperature or pressure. In a case of a lyotropic liquid crystal compound, the liquid crystal phase formed by the alignment treatment can also be transferred by a compositional ratio such as an amount of solvent.

The conditions in a case of heating the composition layer are not particularly limited, and the heating temperature is preferably 50° C. to 250° C. and more preferably 50° C. to 150° C., and the heating time is preferably 10 seconds to 10 minutes.

In addition, after the composition layer is heated, the coating film may be cooled, if necessary, before a curing treatment which will be described later. The cooling temperature is preferably 20° C. to 200° C. and more preferably 30° C. to 150° C.

In addition, after the heat treatment is carried out, the helical twisting power of the chiral agent may be changed by irradiating with light, and then heating may be carried out again to control a twisted angle of twisted alignment.

Next, the composition layer in which the polymerizable liquid crystal compound is aligned is subjected to a curing treatment.

The method of the curing treatment carried out on the composition layer in which the polymerizable liquid crystal compound is aligned is not particularly limited, and examples thereof include a light irradiation treatment and a heat treatment. Above all, from the viewpoint of manufacturing suitability, a light irradiation treatment is preferable, and an ultraviolet irradiation treatment is more preferable.

The irradiation conditions of the light irradiation treatment are not particularly limited, and an irradiation amount of 50 to 1,000 mJ/cm$^2$ is preferable.

The atmosphere during the light irradiation treatment is not particularly limited and is preferably a nitrogen atmosphere.

Although the method of applying the polymerizable liquid crystal composition to form the composition layer has been described above, a composition layer may be separately formed and transferred onto a predetermined substrate.

The polymerizable liquid crystal composition used above contains the above-mentioned liquid crystal compound having a polymerizable group and chiral agent, and other components used as necessary (for example, a polymerization initiator, a photosensitizer, a polymerizable monomer, a surfactant, a polymer, and a solvent).

The content of each component in the composition is preferably adjusted to be the content of each component in the composition layer which will be described later.

The content of the liquid crystal compound in the polymerizable liquid crystal composition is not particularly limited, and is preferably 60% by mass or more and more preferably 70% by mass or more with respect to the total solid content in the polymerizable liquid crystal composition, from the viewpoint that the alignment state of the liquid crystal compound can be easily controlled. The upper limit of the content of the liquid crystal compound is not particularly limited, and is preferably 99% by mass or less and more preferably 97% by mass or less.

The solid content means a component capable of forming an optically anisotropic layer from which a solvent has been removed, and even in a case where a component itself is in a liquid state, such a component is regarded as the solid content.

As described above, the polymerizable liquid crystal composition may contain components other than the liquid crystal compound.

For example, the polymerizable liquid crystal composition may contain a polymerization initiator. In a case where the polymerizable liquid crystal composition contains a polymerization initiator, the polymerization of the liquid crystal compound having a polymerizable group proceeds more efficiently.

The polymerization initiator may be, for example, a known polymerization initiator, examples of which include a photopolymerization initiator and a thermal polymerization initiator, among which a photopolymerization initiator is preferable.

The content of the polymerization initiator in the polymerizable liquid crystal composition is not particularly limited, and is preferably 0.01% to 20% by mass and more preferably 0.5% to 10% by mass with respect to the total solid content in the polymerizable liquid crystal composition.

The polymerizable liquid crystal composition may contain a photosensitizer.

The type of the photosensitizer is not particularly limited, and examples thereof include a known photosensitizer.

The content of the photosensitizer in the polymerizable liquid crystal composition is not particularly limited, and is preferably 0.01% to 20% by mass and more preferably 0.5% to 10% by mass with respect to the total solid content in the polymerizable liquid crystal composition.

The polymerizable liquid crystal composition may contain a polymerizable monomer different from the liquid crystal compound having a polymerizable group. Examples of the polymerizable monomer include a radically polymerizable compound and a cationically polymerizable compound, among which a polyfunctional radically polymerizable monomer is preferable. Examples of the polymerizable monomer include polymerizable monomers described in paragraphs [0018] to [0020] of JP2002-296423A.

The content of the polymerizable monomer in the polymerizable liquid crystal composition is not particularly limited, and is preferably 1% to 50% by mass and more preferably 5% to 30% by mass with respect to the total mass of the liquid crystal compound.

The polymerizable liquid crystal composition may contain a surfactant. Examples of the surfactant include conventionally known compounds, among which a fluorine-based compound is preferable. Specific examples of the surfactant include compounds described in paragraphs [0028] to [0056] of JP2001-330725A and compounds described in paragraphs [0069] to [0126] of JP2003-295212.

The polymerizable liquid crystal composition may contain a polymer. Examples of the polymer include cellulose esters. Examples of the cellulose ester include cellulose esters described in paragraph [0178] of JP2000-155216A.

The content of the polymer in the polymerizable liquid crystal composition is not particularly limited, and is preferably 0.1% to 10% by mass and more preferably 0.1% to 8% by mass with respect to the total mass of the liquid crystal compound.

Second Embodiment

Figure 7:
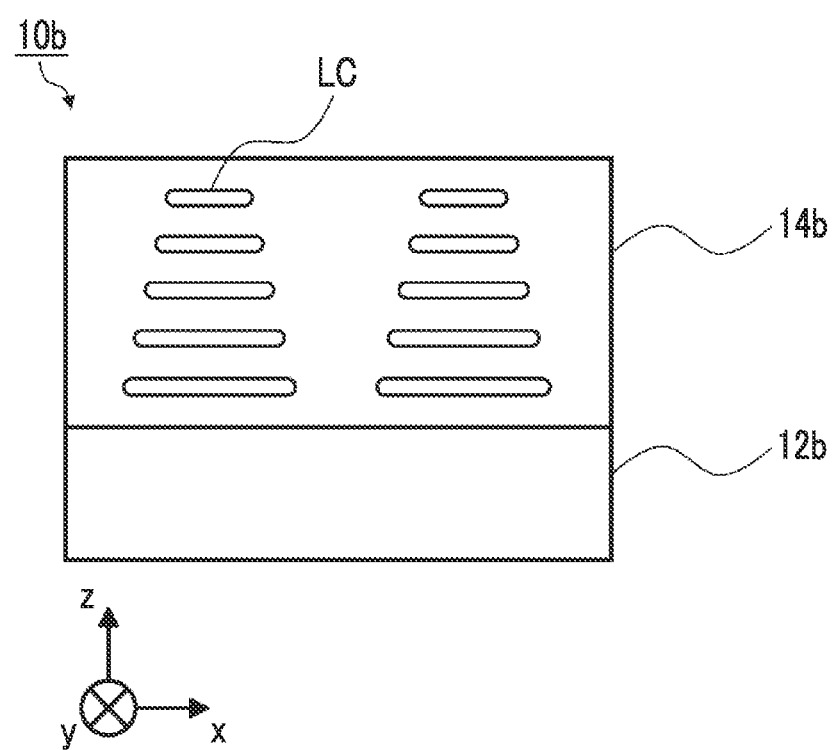
FIG. 7 is an example of a schematic cross-sectional view of a second embodiment of the phase difference plate of the present invention.

Hereinafter, the second embodiment of the phase difference plate according to the embodiment of the present invention will be described with reference to the accompanying drawings. FIG. 7 shows a schematic cross-sectional view of the second embodiment of the phase difference plate according to the embodiment of the present invention.

A phase difference plate 10b has a first optically anisotropic layer 12b and a second optically anisotropic layer 14b.

The first optically anisotropic layer 12b is a polymer film, and the second optically anisotropic layer 14b is a layer formed of a rod-like liquid crystal compound LC. In particular, the second optically anisotropic layer 14b is a layer formed by fixing a twist-aligned liquid crystal compound with a thickness direction as a helical axis.

FIG. 7 shows an example in which a rod-like liquid crystal compound is used as the liquid crystal compound, but as will be described later, the liquid crystal compound is not limited to the rod-like liquid crystal compound.

Hereinafter, the first optically anisotropic layer 12b and the second optically anisotropic layer 14b will be described.
First Optically Anisotropic Layer 12b The first optically anisotropic layer 12b is a polymer film.

The polymer film is a film mainly composed of a polymer, and is preferably a stretched polymer film from the viewpoint that it is easy to show a predetermined retardation which will be described later. The stretched polymer film is a polymer film that has been subjected to a stretch treatment.

The material constituting the polymer film is not particularly limited as long as it satisfies a predetermined retardation which will be described later, and a suitable aspect thereof is the same as that described in the first optically anisotropic layer 12a.

As described above, the in-plane retardation of the first optically anisotropic layer 12b at a wavelength of 550 nm is 60 to 300 nm. The in-plane retardation of the first optically anisotropic layer 12b at a wavelength of 550 nm is preferably 158 to 218 nm and more preferably 178 to 198 nm from the viewpoint that the effect of the present invention is more excellent.

In addition, as described above, the thickness direction retardation of the first optically anisotropic layer 12b at a wavelength of 550 nm is −150 to −30 nm. The thickness direction retardation of the first optically anisotropic layer 12b at a wavelength of 550 nm is preferably −109 to −79 nm and more preferably −99 to −88 nm from the viewpoint that the effect of the present invention is more excellent.

The in-plane slow axis of the first optically anisotropic layer 12b is orthogonal to the in-plane slow axis on the surface of the second optically anisotropic layer 14b on a first optically anisotropic layer 12b side.

The thickness of the first optically anisotropic layer 12b is not particularly limited, and is preferably 1 to 100 μm, more preferably 10 to 70 μm, and still more preferably 20 to 50 μm.
Second Optically Anisotropic Layer 14b As shown in FIG. 7, the second optically anisotropic layer 14b is a layer formed by fixing a twist-aligned rod-like liquid crystal compound LC with a thickness direction (z-axis direction in FIG. 7) as a helical axis.

The phrase "the liquid crystal compound is twist-aligned" is intended to mean that the liquid crystal compound from one main surface to the other main surface of the second optically anisotropic layer 14b is twisted about the thickness direction of the second optically anisotropic layer 14b. Along with this, the alignment direction (that is, in-plane slow axis direction) of the liquid crystal compound differs depending on the position of the second optically anisotropic layer 14b in a thickness direction.

The "fixed" state is a state in which the alignment of a liquid crystal compound is maintained, and the definition thereof is the same as that of the second optically anisotropic layer 14a described above.

The liquid crystal compound contained in the second optically anisotropic layer 14b is not limited to the rod-like liquid crystal compound as in the example shown in FIG. 7.

The liquid crystal compound may be any compound exhibiting liquid crystallinity, and the type of the liquid crystal compound is not particularly limited. The definition, specific examples, and suitable aspects of the liquid crystal compound are the same as those of the liquid crystal compound of the second optically anisotropic layer 14a described above.

The second optically anisotropic layer 14b may contain a chiral agent. The definition, specific examples, and suitable aspects of the chiral agent are the same as those of the chiral agent of the liquid crystal compound of the second optically anisotropic layer 14a described above.

The twisted angle of the liquid crystal compound is preferably within a range of 59°±10° (49° to 69°) and from the viewpoint that the effect of the present invention is more excellent, the twisted angle of the liquid crystal compound is more preferably within a range of 59°±6° (53° to 65°).

There are two types of twisted directions, but it does not matter whether the twisted direction is right-handed or left-handed. That is, with regard to the twisted angle, in a case where a twisted angle is within a range of 59°±10°, it refers to both a case of twisting within a range of 59°±10° clockwise and a case of twisting within a range of 59°±10° counterclockwise.

The twisted angle is measured using an AxoScan (polarimeter) device manufactured by Axometrics, Inc. and using device analysis software attached thereto.

In addition, the second optically anisotropic layer 14b preferably satisfies the relationship of Expression (1-B).

$$203 \text{ nm} \leq \Delta nd \leq 263 \text{ nm} \quad \text{Expression (1-B)}$$

In Expression (1-B), Δn represents the refractive index anisotropy of the second optically anisotropic layer 14b at a wavelength of 550 nm.

In Expression (1-B), d represents the film thickness (nm) of the second optically anisotropic layer 14b.

The second optically anisotropic layer 14b more preferably satisfies the relationship of Expression (1-B1) and still more preferably satisfies the relationship of Expression (1-B2).

$$213 \text{ nm} \leq \Delta nd \leq 253 \text{ nm} \quad \text{Expression (1-B1)}$$

$$223 \text{ nm} \leq \Delta nd \leq 243 \text{ nm} \quad \text{Expression (1-B2)}$$

The Δnd can be adjusted by the type of the liquid crystal compound, the twisted angle, and the film thickness of the second optically anisotropic layer 14b.

The Δnd is measured using an AxoScan (polarimeter) device manufactured by Axometrics, Inc. and using device analysis software attached thereto, in the same manner as the method for measuring the twisted angle.

The thickness of the second optically anisotropic layer 14b is not particularly limited, and is preferably 0.1 to 10.0 μm, more preferably 1.0 to 5.0 μm, and still more preferably 1.0 to 2.5 μm.

The second embodiment of the phase difference plate according to the embodiment of the present invention includes at least the first optically anisotropic layer 12b and the second optically anisotropic layer 14b described above, and may include other members. Other members are the same as the other members described in the first embodiment.

Circularly Polarizing Plate

The second embodiment of the phase difference plate according to the embodiment of the present invention can be used as a circularly polarizing plate in combination with a polarizer. The circularly polarizing plate according to the embodiment of the present invention having the above configuration can be preferably used for the same purpose as the circularly polarizing plate described in the first embodiment, and is for improving a contrast ratio of display light.

The polarizer may be a member having a function of converting natural light into specific linearly polarized light, and examples thereof include an absorption type polarizer.

The type of the polarizer is not particularly limited, and is the same as that of the polarizer described in the first embodiment.

A protective film may be disposed on one side or both sides of the polarizer.

Figure 8:
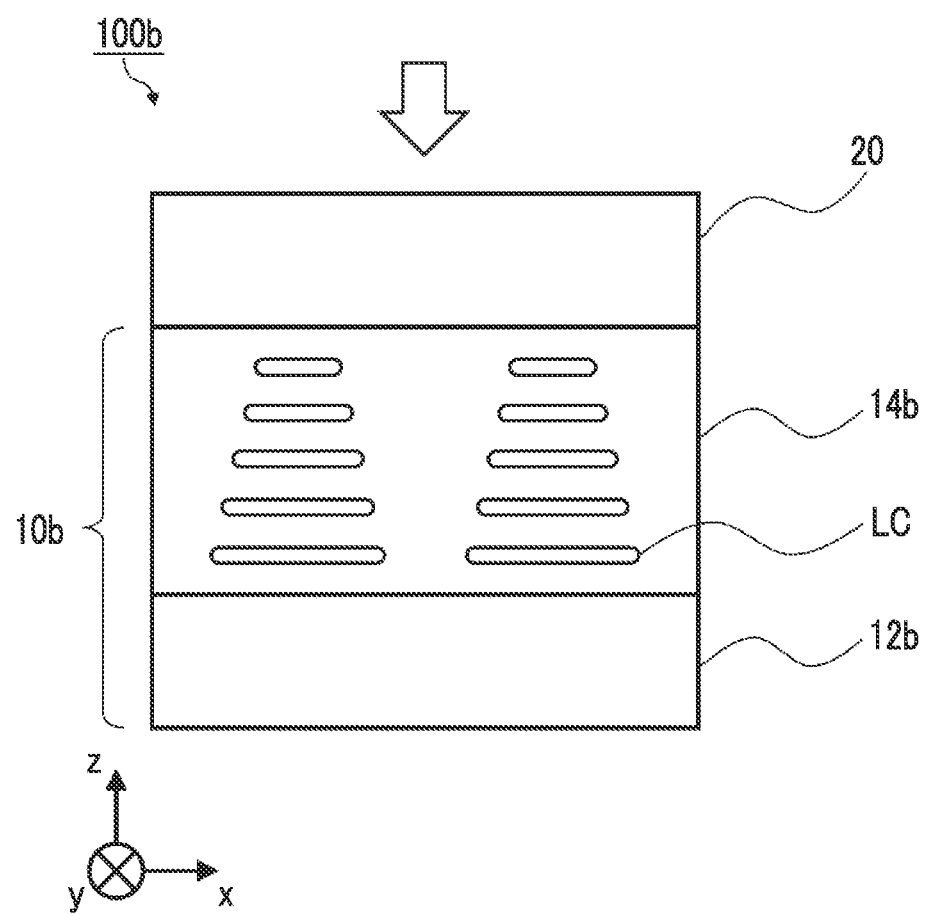
FIG. 8 is an example of a schematic cross-sectional view of a second embodiment of a circularly polarizing plate using the phase difference plate of the present invention.
Figure 9:
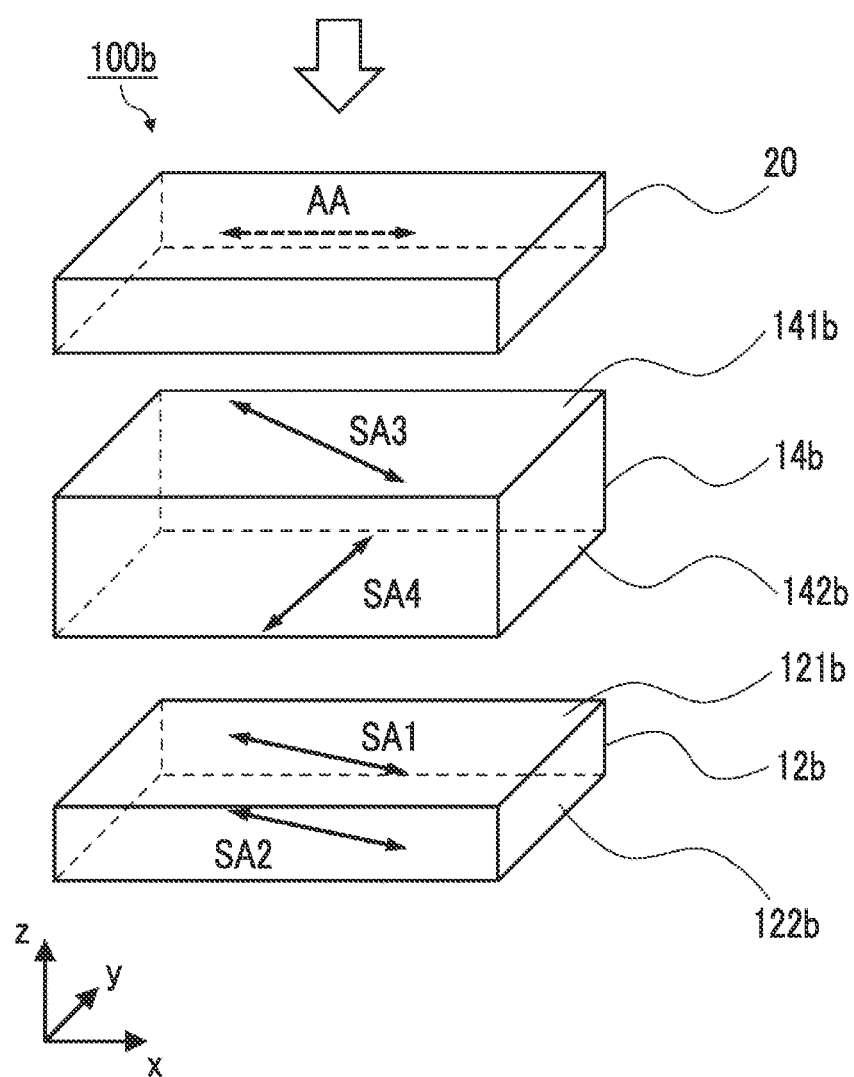
FIG. 9 is a view showing a relationship between the absorption axis of the polarizer 20 and the in-plane slow axis of each of a first optically anisotropic layer 12b and a second optically anisotropic layer 14b in one aspect of the second embodiment of the circularly polarizing plate using the phase difference plate of the present invention.
Figure 10:
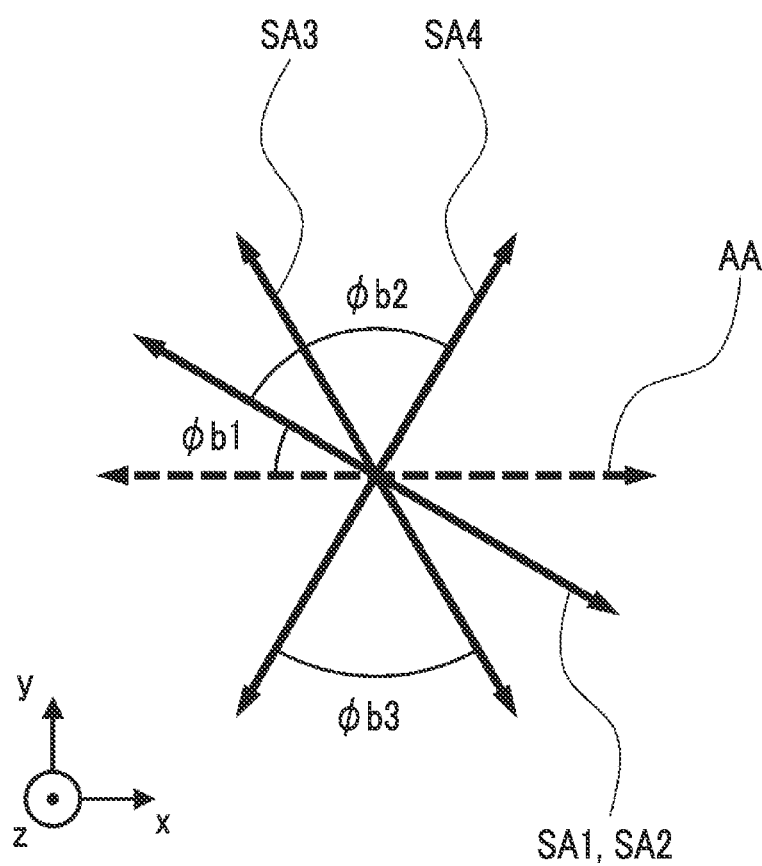
FIG. 10 is a view showing a relationship between the absorption axis of the polarizer 20 and the in-plane slow axis of each of the first optically anisotropic layer 12b and the second optically anisotropic layer 14b, upon observation from the direction of a white arrow in FIG. 9.

FIG. 8 shows a schematic cross-sectional view of an embodiment of a circularly polarizing plate. In addition, FIG. 9 is a view showing the relationship among, in a circularly polarizing plate 100b shown in FIG. 8, an absorption axis AA of the polarizer 20, an in-plane slow axis SA3 on a surface 141b of the second optically anisotropic layer 14b on the polarizer 20 side, an in-plane slow axis SA4 on a surface 142b of the second optically anisotropic layer 14b on the first optically anisotropic layer 12b side, an in-plane slow axis SA1 on a surface 121b of the first optically anisotropic layer 12b on the second optically anisotropic layer 14b side, and an in-plane slow axis SA2 on a surface 122b of the first optically anisotropic layer 12b opposite to the second optically anisotropic layer 14b side. In addition, FIG. 10 is a view showing a relationship of the angle between the absorption axis AA of the polarizer 20 and the in-plane slow axis (SA1 to SA4) of each of the second optically anisotropic layer 14b and the first optically anisotropic layer 12b, upon observation from the white arrow in FIG. 9.

In FIG. 9, the arrow in the polarizer 20 indicates an absorption axis, and the arrow in the first optically anisotropic layer 12b and the second optically anisotropic layer 14b indicates an in-plane slow axis in each layer.

The rotation angle of the in-plane slow axis is represented by a positive angle value in a counterclockwise direction and a negative angle value in a clockwise direction, with reference to the absorption axis AA of the polarizer 20 (0°), upon observation from the white arrow in FIG. 8. In addition, whether the twisted direction is clockwise or counterclockwise is determined with reference to the in-plane slow axis (SA3) on the surface 141b of the front side (the polarizer 20 side) in the second optically anisotropic layer 14b, upon observation from the white arrow in FIG. 8.

As shown in FIG. 8, the circularly polarizing plate 100b includes the polarizer 20, the second optically anisotropic layer 14b, and the first optically anisotropic layer 12b in this order.

As shown in FIG. 9 and FIG. 10, an angle φb1 formed by the absorption axis AA of the polarizer 20 and the in-plane slow axis SA1 on the surface of the first optically anisotropic layer 12b on the polarizer 20 side is 30°. More specifically, the in-plane slow axis SA1 on the surface of the first optically anisotropic layer 12b on the polarizer 20 side is rotated by −30° (clockwise 30°) with respect to the absorption axis AA of the polarizer 20. In addition, although FIG. 9 and FIG. 10 show an aspect in which the in-plane slow axis SA1 on the surface of the first optically anisotropic layer 12b on the polarizer 20 side is located at a position of −30° with respect to the absorption axis AA of the polarizer 20, the present invention is not limited to this aspect. The in-plane slow axis SA1 is preferably located within a range of −30°±10° with respect to the absorption axis AA. That is, the angle formed by the absorption axis AA of the polarizer 20 and the in-plane slow axis SA1 of the first optically anisotropic layer 12*b* is preferably within a range of 30°±10°.

As shown in FIG. 9, in the first optically anisotropic layer 12*b*, the in-plane slow axis SA1 on the surface 121*b* of the first optically anisotropic layer 12*b* on the polarizer 20 side is parallel to the in-plane slow axis SA2 on the surface 122*b* of the first optically anisotropic layer 12*b* opposite to the polarizer 20 side.

As shown in FIG. 9 and FIG. 10, the in-plane slow axis SA1 on the surface 121*b* of the first optically anisotropic layer 12*b* on the second optically anisotropic layer 14*b* side is orthogonal to the in-plane slow axis SA4 on the surface 142*b* of the second optically anisotropic layers 14*b* on the first optically anisotropic layer 12*b* side. That is, an angle φb2 formed by the in-plane slow axis SA1 on the surface 121*b* of the first optically anisotropic layer 12*b* on the second optically anisotropic layer 14*b* side and the in-plane slow axis SA4 on the surface 142*b* of the second optically anisotropic layers 14*b* on the first optically anisotropic layer 12*b* side is 90°. More specifically, the in-plane slow axis SA4 on the surface 142*b* of the second optically anisotropic layer 14*b* on the first optically anisotropic layer 12*b* side is rotated by −90° (clockwise 90°) with respect to the in-plane slow axis SA1 on the surface 121*b* of the first optically anisotropic layer 12*b* on the second optically anisotropic layer 14*b* side. Although FIG. 9 and FIG. 10 show an aspect in which the in-plane slow axis SA4 is located at a position of −90° with respect to the in-plane slow axis SA1, the present invention is not limited to this aspect. The in-plane slow axis SA4 is preferably within a range of −90°±10°. That is, the angle formed by the in-plane slow axis SA1 on the surface 121*b* of the first optically anisotropic layer 12*b* on the second optically anisotropic layer 14*b* side and the in-plane slow axis SA4 on the surface 142*b* of the second optically anisotropic layers 14*b* on the first optically anisotropic layer 12*b* side is preferably within a range of 90°±10°.

As described above, the second optically anisotropic layer 14*b* is a layer in which a twist-aligned liquid crystal compound with a thickness direction as a helical axis is fixed. Therefore, as shown in FIG. 9 and FIG. 10, the in-plane slow axis SA3 on the surface 141*b* of the second optically anisotropic layer 14*b* on the polarizer 20 side and the in-plane slow axis SA4 on the surface 142*b* of the second optically anisotropic layer 14*b* on the first optically anisotropic layer 12*b* side form the above-mentioned twisted angle (59° in FIG. 10). That is, an angle φb3 formed by the in-plane slow axis SA3 on the surface 141*b* of the second optically anisotropic layer 14*b* on the polarizer 20 side and the in-plane slow axis SA4 on the surface 142*b* of the second optically anisotropic layer 14*b* on the first optically anisotropic layer 12*b* side is 59°. More specifically, the in-plane slow axis of the second optically anisotropic layer 14*b* rotates by −59° (clockwise 59°). Therefore, the angle formed by the absorption axis AA of the polarizer 20 and the in-plane slow axis SA3 on the surface 141*b* of the second optically anisotropic layer 14*b* on the polarizer 20 side is 59°.

Although FIG. 9 and FIG. 10 show an aspect in which the in-plane slow axis of the second optically anisotropic layer 14*b* is rotated by −59°, the present invention is not limited to this aspect. The rotation angle may be within a range of −59°±10°. That is, the angle formed by the in-plane slow axis SA3 on the surface 141*b* of the second optically anisotropic layer 14*b* on the polarizer 20 side and the in-plane slow axis SA4 on the surface 142*b* of the second optically anisotropic layer 14*b* on the first optically anisotropic layer 12*b* side is preferably within a range of 59°±10°.

As described above, in the aspect of FIG. 9 and FIG. 10, the in-plane slow axis SA1 on the surface 121*b* of the first optically anisotropic layer 12*b* on the second optically anisotropic layer 14*b* side is located at a position of −30° with reference to the absorption axis AA of the polarizer 20, the in-plane slow axis SA4 on the surface 142*b* of the second optically anisotropic layer 14*b* on the first optically anisotropic layer 12*b* side is located at a position of −90° with respect to the in-plane slow axis SA1 on the surface 121*b* of the first optically anisotropic layer 12*b* on the second optically anisotropic layer 14*b* side, and the twisted direction of the liquid crystal compound in the second optically anisotropic layer 14*b* is clockwise.

In FIG. 9 and FIG. 10, the aspect in which the twisted direction of the liquid crystal compound is clockwise is described in detail, but an aspect in which the twisted direction of the liquid crystal compound is counterclockwise may be configured as long as the relationship of a predetermined angle is satisfied. More specifically, it may be an aspect of in which the in-plane slow axis SA1 on the surface 121*b* of the first optically anisotropic layer 12*b* on the second optically anisotropic layer 14*b* side is located at a position of 30° with reference to the absorption axis AA of the polarizer 20, the in-plane slow axis SA4 on the surface 142*b* of the second optically anisotropic layer 14*b* on the first optically anisotropic layer 12*b* side is located at a position of 90° with respect to the in-plane slow axis SA1 on the surface 121*b* of the first optically anisotropic layer 12*b* on the second optically anisotropic layer 14*b* side, and the twisted direction of the liquid crystal compound in the second optically anisotropic layer 14*b* is counterclockwise.

As shown in FIG. 5 and FIG. 6 described in the first embodiment, in the embodiment shown in FIG. 9 and FIG. 10, the first optically anisotropic layer 12*b* and the second optically anisotropic layer 14*b* may be fixed and the arrangement direction of the polarizer 20 may be rotated by 90°.

Third Embodiment

Figure 11:
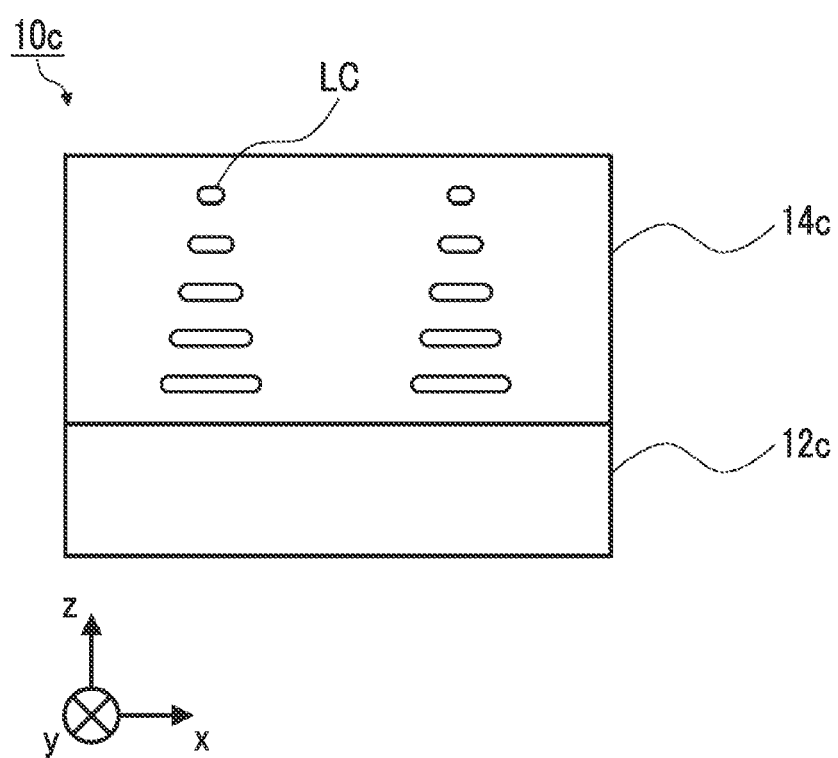
FIG. 11 is an example of a schematic cross-sectional view of a third embodiment of the phase difference plate of the present invention.

Hereinafter, the third embodiment of the phase difference plate according to the embodiment of the present invention will be described with reference to the accompanying drawings. FIG. 11 shows a schematic cross-sectional view of the third embodiment of the phase difference plate according to the embodiment of the present invention.

A phase difference plate 10*c* has a first optically anisotropic layer 12*c* and a second optically anisotropic layer 14*c*. The first optically anisotropic layer 12*c* is a polymer film, and the second optically anisotropic layer 14*c* is a layer formed of a rod-like liquid crystal compound LC. In particular, the second optically anisotropic layer 14*c* is a layer formed by fixing a twist-aligned liquid crystal compound with a thickness direction as a helical axis.

FIG. 11 shows an example in which a rod-like liquid crystal compound is used as the liquid crystal compound, but as will be described later, the liquid crystal compound is not limited to the rod-like liquid crystal compound.

Hereinafter, the first optically anisotropic layer 12*c* and the second optically anisotropic layer 14*c* will be described.

First optically anisotropic layer 12*c*

The first optically anisotropic layer 12*c* is a polymer film. The polymer film is a film mainly composed of a polymer, and is preferably a stretched polymer film from the viewpoint that it is easy to show a predetermined retardation which will be described later. The stretched polymer film is a polymer film that has been subjected to a stretch treatment.

The material constituting the polymer film is not particularly limited as long as it satisfies a predetermined retardation which will be described later, and a suitable aspect thereof is the same as that described in the first optically anisotropic layer 12a.

As described above, the in-plane retardation of the first optically anisotropic layer 12c at a wavelength of 550 nm is 60 to 300 nm. The in-plane retardation of the first optically anisotropic layer 12c at a wavelength of 550 nm is preferably 67.5 to 127.5 nm, more preferably 77.5 to 117.5 nm, and still more preferably 87.5 to 107.5 nm from the viewpoint that the effect of the present invention is more excellent.

In addition, as described above, the thickness direction retardation of the first optically anisotropic layer 12c at a wavelength of 550 nm is −150 to −30 nm. The thickness direction retardation of the first optically anisotropic layer 12c at a wavelength of 550 nm is preferably −64 to −33 nm and more preferably −59 to −38 nm from the viewpoint that the effect of the present invention is more excellent.

The angle formed by the in-plane slow axis of the first optically anisotropic layer 12c and the in-plane slow axis on the surface of the second optically anisotropic layer 14c on the first optically anisotropic layer 12c side is preferably 30° to 70°. The in-plane slow axis on the surface of the second optically anisotropic layer 14c on the first optically anisotropic layer 12c side may be located clockwise or counterclockwise with respect to the in-plane slow axis of the first optically anisotropic layer 12c.

The thickness of the first optically anisotropic layer 12c is not particularly limited, and is preferably 1 to 100 μm, more preferably 10 to 70 μm, and still more preferably 20 to 50 μm.

Second Optically Anisotropic Layer 14c

As shown in FIG. 11, the second optically anisotropic layer 14c is a layer formed by fixing a twist-aligned rod-like liquid crystal compound LC with a thickness direction (z-axis direction in FIG. 11) as a helical axis.

The phrase "the liquid crystal compound is twist-aligned" is intended to mean that the liquid crystal compound from one main surface to the other main surface of the second optically anisotropic layer 14c is twisted about the thickness direction of the second optically anisotropic layer 14c. Along with this, the alignment direction (that is, in-plane slow axis direction) of the liquid crystal compound differs depending on the position of the second optically anisotropic layer 14c in a thickness direction.

The "fixed" state is a state in which the alignment of a liquid crystal compound is maintained, and the definition thereof is the same as that of the second optically anisotropic layer 14a described above.

The liquid crystal compound contained in the second optically anisotropic layer 14c is not limited to the rod-like liquid crystal compound as in the example shown in FIG. 11. The liquid crystal compound may be any compound exhibiting liquid crystallinity, and the type of the liquid crystal compound is not particularly limited. The definition, specific examples, and suitable aspects of the liquid crystal compound are the same as those of the liquid crystal compound of the second optically anisotropic layer 14a described above.

The second optically anisotropic layer 14c may contain a chiral agent. The definition, specific examples, and suitable aspects of the chiral agent are the same as those of the chiral agent of the liquid crystal compound of the second optically anisotropic layer 14a described above.

The twisted angle of the liquid crystal compound is preferably within a range of 40°±20° (20° to 60°) and from the viewpoint that the effect of the present invention is more excellent, the twisted angle of the liquid crystal compound is more preferably within a range of 40°±10° (30° to 50°).

There are two types of twisted directions, but it does not matter whether the twisted direction is right-handed or left-handed. That is, with regard to the twisted angle, in a case where a twisted angle is within a range of 40°±20°, it refers to both a case of twisting within a range of 40°±20° clockwise and a case of twisting within a range of 40°±20° counterclockwise.

The twisted angle is measured using an AxoScan (polarimeter) device manufactured by Axometrics, Inc. and using device analysis software attached thereto.

In a case where the in-plane slow axis on the surface of the second optically anisotropic layer 14c on the first optically anisotropic layer 12c side is located in a direction of clockwise rotation with respect to the in-plane slow axis of the first optically anisotropic layer 12c, it is preferable that the twisted direction of the second optically anisotropic layer 14c is twisted in a clockwise direction. In addition, in a case where the in-plane slow axis on the surface of the second optically anisotropic layer 14c on the first optically anisotropic layer 12c side is located in a direction of counterclockwise rotation with respect to the in-plane slow axis of the first optically anisotropic layer 12c, it is preferable that the twisted direction of the second optically anisotropic layer 14c is twisted in a counterclockwise direction.

In addition, the second optically anisotropic layer 14c preferably satisfies the relationship of Expression (1-C).

$$317 \text{ nm} \leq \Delta nd \leq 377 \text{ nm} \quad \text{Expression (1-C)}$$

In Expression (1-C), Δn represents the refractive index anisotropy of the second optically anisotropic layer 14c at a wavelength of 550 nm.

In Expression (1-C), d represents the film thickness (nm) of the second optically anisotropic layer 14c.

The second optically anisotropic layer 14c more preferably satisfies the relationship of Expression (1-C1) and still more preferably satisfies the relationship of Expression (1-C2).

$$327 \text{ nm} \leq \Delta nd \leq 367 \text{ nm} \quad \text{Expression (1-C1)}$$

$$337 \text{ nm} \leq \Delta nd \leq 357 \text{ nm} \quad \text{Expression (1-C2)}$$

The Δnd can be adjusted by the type of the liquid crystal compound, the twisted angle, and the film thickness of the second optically anisotropic layer 14c.

The Δnd is measured using an AxoScan (polarimeter) device manufactured by Axometrics, Inc. and using device analysis software attached thereto, in the same manner as the method for measuring the twisted angle.

The thickness of the second optically anisotropic layer 14c is not particularly limited, and is preferably 0.1 to 10.0 μm, more preferably 1.0 to 5.0 μm, and still more preferably 1.0 to 2.5 μm.

The third embodiment of the phase difference plate according to the embodiment of the present invention includes at least the first optically anisotropic layer 12c and the second optically anisotropic layer 14c described above, and may include other members. Other members are the same as the other members described in the first embodiment.

Circularly Polarizing Plate

The third embodiment of the phase difference plate according to the embodiment of the present invention can be used as a circularly polarizing plate in combination with a polarizer.

The circularly polarizing plate according to the embodiment of the present invention having the above configuration can be preferably used for the same purpose as the circularly polarizing plate described in the first embodiment, and is for improving a contrast ratio of display light.

The polarizer may be a member having a function of converting natural light into specific linearly polarized light, and examples thereof include an absorption type polarizer.

The type of the polarizer is not particularly limited, and is the same as that of the polarizer described in the first embodiment.

A protective film may be disposed on one side or both sides of the polarizer.

Figure 12:
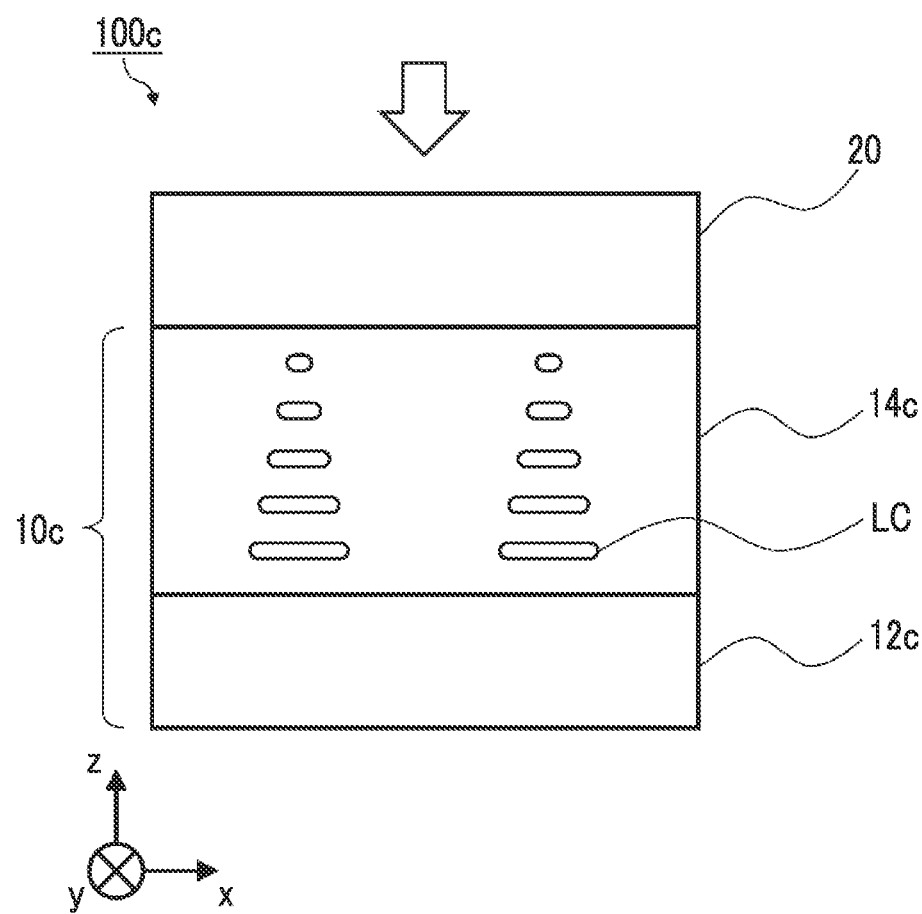
FIG. 12 is an example of a schematic cross-sectional view of a third embodiment of the circularly polarizing plate using the phase difference plate of the present invention.
Figure 13:
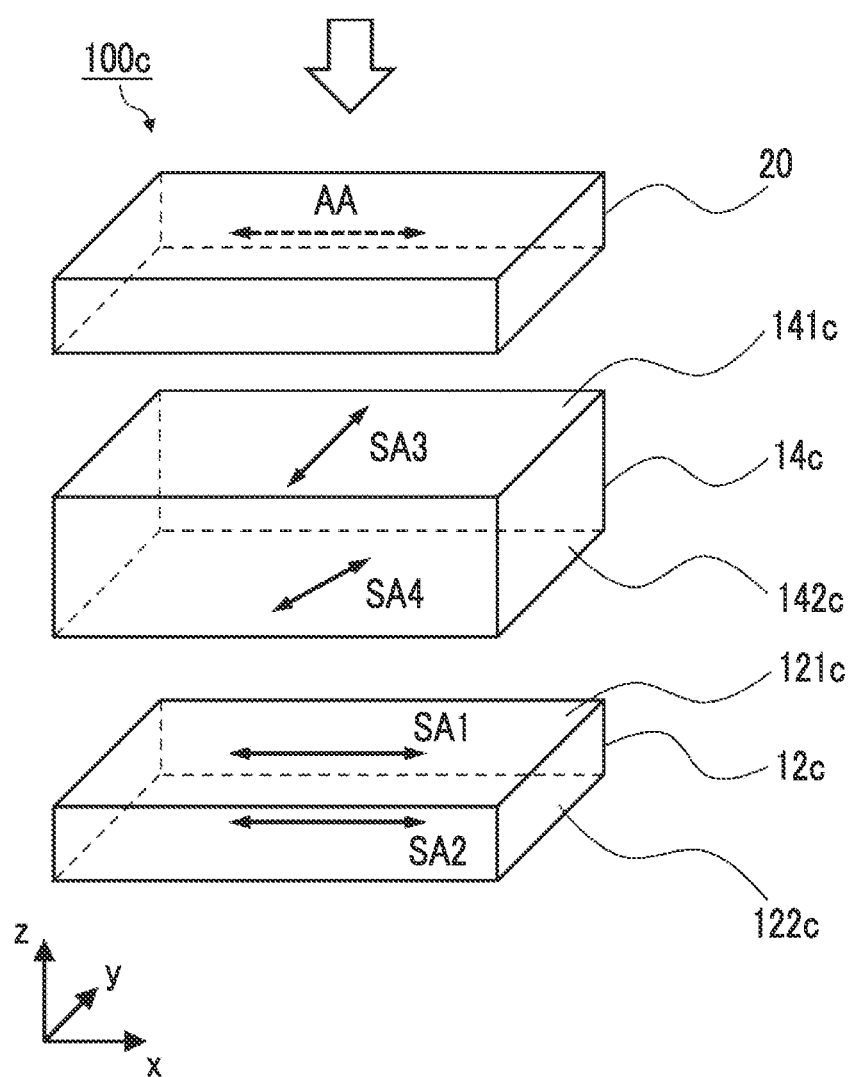
FIG. 13 is a view showing a relationship between the absorption axis of the polarizer 20 and the in-plane slow axis of each of a first optically anisotropic layer 12c and a second optically anisotropic layer 14c in one aspect of the third embodiment of the circularly polarizing plate using the phase difference plate of the present invention.
Figure 14:
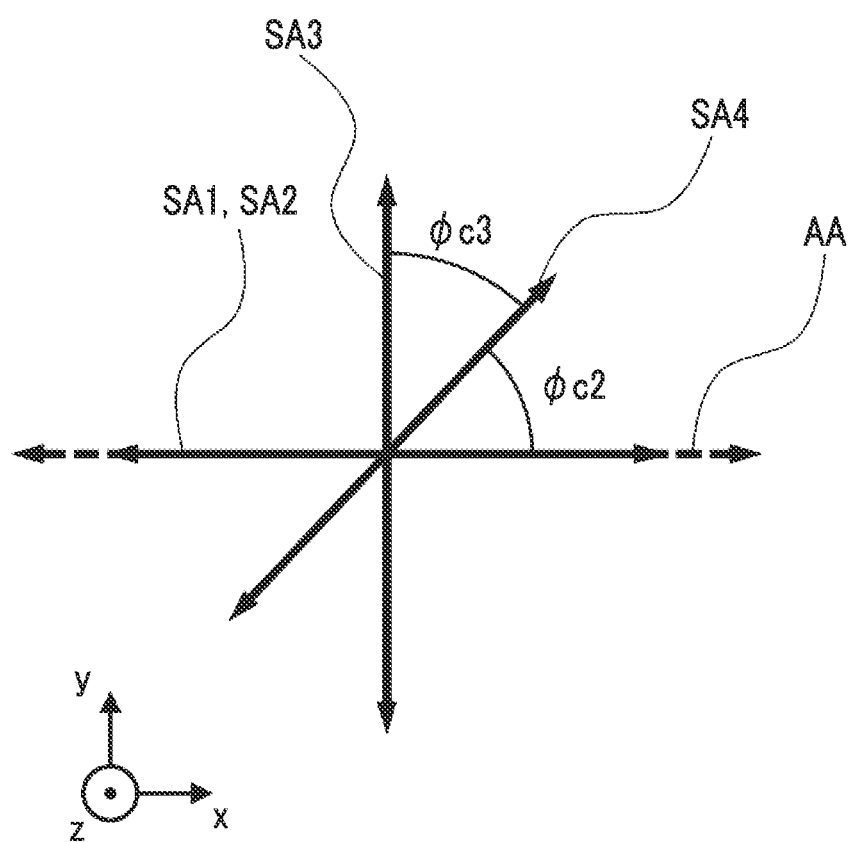
FIG. 14 is a view showing a relationship between the absorption axis of the polarizer 20 and the in-plane slow axis of each of the first optically anisotropic layer 12c and the second optically anisotropic layer 14c, upon observation from the direction of a white arrow in FIG. 13.

FIG. 12 shows a schematic cross-sectional view of an embodiment of a circularly polarizing plate. In addition, FIG. 13 is a view showing the relationship among, in a circularly polarizing plate 100c shown in FIG. 12, an absorption axis AA of the polarizer 20, an in-plane slow axis SA3 on a surface 141c of the second optically anisotropic layer 14c on the polarizer 20 side, an in-plane slow axis SA4 on a surface 142c of the second optically anisotropic layer 14c on the first optically anisotropic layer 12c side, an in-plane slow axis SA1 on a surface 121c of the first optically anisotropic layer 12c on the second optically anisotropic layer 14c side, and an in-plane slow axis SA2 on a surface 122c of the first optically anisotropic layer 12c opposite to the second optically anisotropic layer 14c side. In addition, FIG. 14 is a view showing a relationship of the angle between the absorption axis AA of the polarizer 20 and the in-plane slow axis (SA1 to SA4) of each of the second optically anisotropic layer 14c and the first optically anisotropic layer 12c, upon observation from the white arrow in FIG. 12.

In FIG. 13, the arrow in the polarizer 20 indicates an absorption axis, and the arrow in the first optically anisotropic layer 12c and the second optically anisotropic layer 14c indicates an in-plane slow axis in each layer.

The rotation angle of the in-plane slow axis is represented by a positive angle value in a counterclockwise direction and a negative angle value in a clockwise direction, with reference to the absorption axis AA of the polarizer 20 (0°), upon observation from the white arrow in FIG. 12. In addition, whether the twisted direction is clockwise or counterclockwise is determined with reference to the in-plane slow axis (SA3) on the surface 141c of the front side (the polarizer 20 side) in the second optically anisotropic layer 14c, upon observation from the white arrow in FIG. 12.

As shown in FIG. 12, the circularly polarizing plate 100c includes the polarizer 20, the second optically anisotropic layer 14c, and the first optically anisotropic layer 12c in this order.

As shown in FIG. 13 and FIG. 14, the absorption axis AA of the polarizer 20 is parallel to the in-plane slow axis SA1 on the surface 121c of the first optically anisotropic layer 12c on the second optically anisotropic layer 14c side. FIG. 13 and FIG. 14 show an aspect in which the in-plane slow axis SA1 of the first optically anisotropic layer 12c is located parallel to the absorption axis AA of the polarizer 20.

As shown in FIG. 13, in the first optically anisotropic layer 12c, the in-plane slow axis SA1 on the surface 121c of the first optically anisotropic layer 12c on the polarizer 20 side is parallel to the in-plane slow axis SA2 on the surface 122c of the first optically anisotropic layer 12c opposite to the polarizer 20 side.

As shown in FIG. 13 and FIG. 14, the angle formed by the in-plane slow axis SA1 on the surface 121c of the first optically anisotropic layer 12c on the second optically anisotropic layer 14c side and the in-plane slow axis SA4 on the surface 142c of the second optically anisotropic layers 14c on the first optically anisotropic layer 12c side is 50°. That is, an angle φc2 formed by the in-plane slow axis SA1 on the surface 121c of the first optically anisotropic layer 12c on the second optically anisotropic layer 14c side and the in-plane slow axis SA4 on the surface 142c of the second optically anisotropic layers 14c on the first optically anisotropic layer 12c side is 50°. More specifically, the in-plane slow axis SA4 on the surface 142c of the second optically anisotropic layer 14c on the first optically anisotropic layer 12c side is rotated by 50° (counterclockwise 50°) with respect to the in-plane slow axis SA1 on the surface 121c of the first optically anisotropic layer 12c on the second optically anisotropic layer 14c side. Although FIG. 13 and FIG. 14 show an aspect in which the in-plane slow axis SA4 on the surface 142c of the second optically anisotropic layer 14c on the first optically anisotropic layer 12c side is located at a position of 50° with respect to the in-plane slow axis SA1 on the surface 121c of the first optically anisotropic layer 12c on the second optically anisotropic layer 14c side, the present invention is not limited to this aspect. The in-plane slow axis SA4 is preferably within a range of 50°±20°. That is, the angle formed by the in-plane slow axis SA1 on the surface 121c of the first optically anisotropic layer 12c on the second optically anisotropic layer 14c side and the in-plane slow axis SA4 on the surface 142c of the second optically anisotropic layers 14c on the first optically anisotropic layer 12c side is preferably within a range of 50°±20°.

As described above, the second optically anisotropic layer 14c is a layer in which a twist-aligned liquid crystal compound with a thickness direction as a helical axis is fixed. Therefore, as shown in FIG. 13 and FIG. 14, the in-plane slow axis SA3 on the surface 141c of the second optically anisotropic layer 14c on the polarizer 20 side and the in-plane slow axis SA4 on the surface 142c of the second optically anisotropic layer 14c opposite to the first optically anisotropic layer 12c side form the above-mentioned twisted angle (40° in FIG. 14). That is, an angle φc3 formed by the in-plane slow axis SA3 on the surface 141c of the second optically anisotropic layer 14c on the polarizer 20 side and the in-plane slow axis SA4 on the surface 142c of the second optically anisotropic layer 14c opposite to the first optically anisotropic layer 12c side is 40°. More specifically, the in-plane slow axis of the second optically anisotropic layer 14c rotates by −40° (clockwise 40°). Therefore, the angle formed by the absorption axis AA of the polarizer 20 and the in-plane slow axis SA3 on the surface 141c of the second optically anisotropic layer 14c on the polarizer 20 side is 90°.

Although FIG. 13 and FIG. 14 show an aspect in which the in-plane slow axis of the second optically anisotropic layer 14c is rotated by −40°, the present invention is not limited to this aspect. The rotation angle may be within a range of −40°±20°. That is, the angle formed by the in-plane slow axis SA3 on the surface 141c of the second optically anisotropic layer 14c on the polarizer 20 side and the in-plane slow axis SA4 on the surface 142c of the second optically anisotropic layer 14c on the first optically anisotropic layer 12c side is preferably within a range of 40°±20°.

As described above, in the aspect of FIG. 13 and FIG. 14, the in-plane slow axis SA4 on the surface 142*c* of the second optically anisotropic layer 14*c* on the first optically anisotropic layer 12*c* side is located at a position of 50° with reference to the absorption axis AA of the polarizer 20, and the twisted direction of the liquid crystal compound in the second optically anisotropic layer 14*c* is clockwise.

In FIG. 13 and FIG. 14, the aspect in which the twisted direction of the liquid crystal compound is clockwise is described in detail, but an aspect in which the twisted direction of the liquid crystal compound is counterclockwise may be configured as long as the relationship of a predetermined angle is satisfied. More specifically, it may be an aspect in which the in-plane slow axis SA4 on the surface 142*c* of the second optically anisotropic layer 14*c* on the first optically anisotropic layer 12*c* side is located at a position of −50° with reference to the absorption axis AA of the polarizer 20, and the twisted direction of the liquid crystal compound in the first optically anisotropic layer 12*c* is counterclockwise.

As shown in FIG. 5 and FIG. 6 described in the first embodiment, in the embodiment shown in FIG. 13 and FIG. 14, the first optically anisotropic layer 12*c* and the second optically anisotropic layer 14*c* may be fixed and the arrangement direction of the polarizer 20 may be rotated by 90°.

Further, in the aspect in which the twisted direction of the liquid crystal compound is counterclockwise, the first optically anisotropic layer 12*c* and the second optically anisotropic layer 14*c* may be fixed and the arrangement direction of the polarizer 20 may be rotated by 90°.

Image Display Apparatus

The phase difference plate and circularly polarizing plate (first embodiment to third embodiment) according to the embodiment of the present invention can be suitably applied to an image display apparatus.

The image display apparatus according to the embodiment of the present invention has an image display element and the above-mentioned phase difference plate or circularly polarizing plate.

In a case where the phase difference plate according to the embodiment of the present invention is applied to an image display apparatus, it is preferably applied as the above-mentioned circularly polarizing plate. In this case, the circularly polarizing plate is disposed on the viewing side, and the polarizer is disposed on the viewing side in the circularly polarizing plate.

The image display element is not particularly limited, and examples thereof include an organic electroluminescence display element and a liquid crystal display element.

EXAMPLES

Hereinafter, the present invention will be described in more detail with reference to Examples.

The materials, amounts used, proportions, treatment details, treatment procedure, and the like shown in the following Examples can be appropriately changed without departing from the spirit and scope of the present invention. Accordingly, the scope of the present invention should not be construed as being limited to the Examples set forth below.

Production of Circularly Polarizing Plate

The procedure for producing a circularly polarizing plate using a phase difference plate in each of Examples and Comparative Examples will be described in detail. First, the method for producing each layer used in each of Examples and Comparative Examples will be described, and then the configuration of each of Examples and Comparative Examples will be described.

Polarizer

A polyvinyl alcohol film having a thickness of 80 μm was dyed by immersing the film in an aqueous iodine solution having an iodine concentration of 0.05% by mass at 30° C. for 60 seconds. Next, the obtained film was machine-direction stretched 5 times its original length while immersed in an aqueous boric acid solution having a boric acid concentration of 4% by mass for 60 seconds, and then dried at 50° C. for 4 minutes to obtain a polarizer having a thickness of 20 μm.

Polymer Film

A method for producing polymer films 1 to 7 corresponding to the first optically anisotropic layer will be described. The in-plane retardation Re, the thickness direction retardation Rth, the film thickness, the in-plane slow axis direction, and the glass transition temperature of each polymer film were as shown in Table 1 which will be described later.

Polymer Film 1

The polymer blend solution described in Example 1 of JP2018-510921A was prepared so that the ratio of poly (methylmethacrylate)(PMMA)/poly($\alpha,\beta,\beta$-trifluorostyrene) (PTFS)=20 (% by mass)/80 (% by mass), based on the total mass of PMMA and PTFS solids.

The prepared polymer blend solution was applied onto a flat glass substrate using a blade casting method to obtain a coating film. The resulting coating film was dried overnight in air and further dried in a vacuum oven for 8 hours at room temperature. After drying, the film was peeled off from the glass substrate to obtain a substrate 1.

The obtained substrate 1 was stretched at 110° C. at a stretching rate of 30% so as to have the characteristics shown in Table 1 which will be described later to obtain a polymer film 1.

Polymer Film 2

The polymer film 2 was obtained in the same manner as in the method for producing the polymer film 1, except that the stretching conditions were adjusted so that the in-plane slow axis direction was as shown in Table 1 which will be described later.

Polymer Film 3

The polymer film 3 was obtained in the same manner as in the method for producing the polymer film 1, except that the stretching conditions were adjusted so that the in-plane retardation Re, the thickness direction retardation Rth, the thickness, and the in-plane slow axis direction were as shown in Table 1 which will be described later.

Polymer Film 4

The polymer film 4 was obtained in the same manner as in the method for producing the polymer film 1, except that the stretching conditions were adjusted so that the in-plane retardation Re, the thickness direction retardation Rth, the thickness, and the in-plane slow axis direction were as shown in Table 1 which will be described later.

Polymer Film 5

90 parts by mass of syndiotactic polystyrene ("130-ZC", manufactured by Idemitsu Kosan Co., Ltd., glass transition temperature: 98° C., crystallization temperature: 140° C.) and 10 parts by mass of poly(2,6-dimethyl-1,4-phenylene oxide) (Catalog No. 18242-7, manufactured by Sigma-Aldrich Co. LLC.) were kneaded with a twin screw extruder to obtain pellets of a transparent resin R2. The glass transition temperature of the obtained resin R2 was 105° C. The resin was supplied to a twin screw extruder and melt-extruded into a sheet at about 280° C. to obtain a resin sheet having a thickness of 80 µm. This unstretched sheet was stretched 1.5 times in length and 1.8 times in width under a temperature condition of 140° C. to obtain a polymer film 5.

Polymer Film 6

64 parts by mass of syndiotactic polystyrene ("130-ZC", manufactured by Idemitsu Kosan Co., Ltd., glass transition temperature: 98° C., crystallization temperature: 140° C.) and 36 parts by mass of poly(2,6-dimethyl-1,4-phenylene oxide) (Catalog No. 18242-7, manufactured by Sigma-Aldrich Co. LLC.) were kneaded with a twin screw extruder to obtain pellets of a transparent resin R3. The glass transition temperature of the obtained resin R3 was 134° C.

Next, a film molding apparatus for coextrusion molding of two types and two layers (a type of molding apparatus that can mold a film having a two-layer structure using two types of resins) including a single screw extruder equipped with a double flight type screw was prepared. The pellets of the resin R3 were put into one of the single screw extruders of the film molding apparatus and melted. In addition, pellets of impact-resistant polymethylmethacrylate resin R6 ("SUMIPEX HT55X", manufactured by Sumitomo Chemical Co., Ltd.) were put into the other single screw extruder of the film molding apparatus and melted.

The molten resin R3 at 290° C. was supplied to one manifold of a multi-manifold die (die-slip surface roughness Ra: 0.1 µm) through a leaf disk-shaped polymer filter having an opening of 10 µm. In addition, the molten resin R6 at 260° C. was supplied to the other manifold of the multi-manifold die through the leaf disk-shaped polymer filter having an opening of 10 µm.

The resin R3 and the resin R6 were simultaneously extruded from the multi-manifold die at 280° C. to form a film. The molded film-like molten resin was cast on a cast roll adjusted to a surface temperature of 110° C., and then passed between two cooling rolls adjusted to a surface temperature of 50° C. The resin was cooled and solidified on the cast roll to obtain a pre-stretched film having a layer consisting of the resin R3 and a layer consisting of the resin R6. At this time, a pre-stretched film PF-4 (thickness: 100 µm) having a layer consisting of the resin R3 (thickness: 50 µm) and a layer consisting of the resin R6 (thickness 50: µm) was produced by adjusting the rotation speed of the cast roll.

The pre-stretched film PF-4 was freely uniaxially stretched in the longitudinal direction of the pre-stretched film, and then the layer consisting of the resin R6 was peeled off to obtain a polymer film 6 consisting of the resin R3. At this time, the stretching temperature and the stretching ratio were within a range of the stretching temperature of 134° C. to 144° C. at the stretching ratio of 1.6 times.

Polymer Film 7

$2 \times 10^{-4}$ mol of manganese acetate tetrahydrate and $8 \times 10^{-4}$ mol of calcium acetate monohydrate as ester exchange catalysts were added to FDPM (1.00 mol), BPEF (0.80 mol), and EG (2.20 mol) which were then gradually heated and melted while stirring. After raising the temperature to 230° C., $14 \times 10^{-4}$ mol of trimethyl phosphate and $20 \times 10^{-4}$ mol of germanium oxide were added, and EG was removed while gradually raising the temperature and reducing the pressure until the temperature reached 270° C. and the pressure reached 0.13 kPa or less. After reaching a predetermined stirring torque, the contents were taken out from the reactor to obtain pellets of a polyester resin 1.

In addition, FDPM, BPEF, and EG represent the following compounds.

FDPM: 9,9-bis(2-methoxycarbonylethyl)fluorene [dimethyl ester of 9,9-bis(2-carboxyethyl)fluorene (or fluorene-9,9-dipropionic acid)]

BPEF: 9,9-bis[4-(2-hydroxyethoxy)phenyl]fluorene, manufactured by Osaka Gas Chemicals Co., Ltd.

EG: ethylene glycol

FDPM used was synthesized in the same manner as in Example 1 of JP2005-89422A, except that t-butyl acrylate was changed to 37.9 g (0.44 mol) of methyl acrylate.

In a case where the obtained pellets were analyzed by $^1$H-NMR, 100 mol % of the dicarboxylic acid component introduced into the polyester resin 1 was derived from FDPM, and 80 mol % of the introduced diol component was derived from BPEF and 20 mol % of the introduced diol component was derived from EG.

The polyester resin 1 had a glass transition temperature Tg of 125° C. and a weight-average molecular weight Mw of 66,500.

The obtained polyester resin 1 was melt-extruded and molded at a temperature of 260° C. using a twin screw extruder ("KZW15-30MG", manufactured by Technovel Corporation, L/D=45, screw diameter: D15 mm, rotation speed: 200 rpm), and a raw film was prepared using a T-die and a take-up device. The obtained raw film was uniaxially stretched in a transport direction at a stretching ratio of 300% (stretching speed of 120 mm/min) to obtain a polymer film 7.

Polymer Film 8

Pellets of thermoplastic norbornene resin (trade name "ZEONOR 1420R", manufactured by Zeon Corporation) were dried at 90° C. for 5 hours. The dried pellets were supplied to an extruder, melted in the extruder, passed through a polymer pipe and a polymer filter, and extruded into a sheet from the T-die onto the casting drum, and the extruded sheet was cooled and wound to obtain a roll of pre-stretched substrate.

The obtained pre-stretched substrate was pulled out from the roll, supplied to a tenter stretching machine, and stretched. Further, both ends in the width direction of the film were trimmed and the film was wound to obtain a polymer film 8.

Polymer Film 9

The polymer film 9 was obtained in the same manner as the polymer film 8, except that, in the production of the polymer film 8, the stretching conditions were adjusted so that the in-plane retardation Re, the thickness direction retardation Rth, the in-plane slow axis direction, and the thickness were as shown in Table 1 which will be described later.

The in-plane slow axis direction in Table 1 is a value representing counterclockwise as a positive value with the transport direction (longitudinal direction) of the polymer film as a reference (0°), upon observation from the side where the optically anisotropic layer which will be described later is disposed.

TABLE 1

|  | Re (nm) | Rth (nm) | Film thickness (μm) | In-plane slow axis direction (°) | Glass transition temperature (° C.) |
|---|---|---|---|---|---|
| Polymer film 1 | 170 | −85 | 38 | −10 | 150 |
| Polymer film 2 | 170 | −85 | 38 | −105 | 150 |
| Polymer film 3 | 98 | −49 | 22 | 0 | 150 |
| Polymer film 4 | 98 | −49 | 22 | −90 | 150 |
| Polymer film 5 | 98 | −49 | 40 | 0 | 105 |
| Polymer film 6 | 98 | −49 | 50 | 0 | 134 |
| Polymer film 7 | 98 | −49 | 28 | 0 | 125 |
| Polymer film 8 | 130 | 65 | 38 | 15 | 135 |
| Polymer film 9 | 170 | 85 | 50 | −10 | 135 |

Example 1

The surface of the polymer film 1 was subjected to a corona treatment.

A composition T1 for forming an optically anisotropic layer containing a rod-like liquid crystal compound was applied onto the polymer film 1 on the corona-treated surface of the polymer film 1 using a Geeser coating machine, and the polymer film on which a composition layer was formed was heated at 90° C. for 80 seconds.

Then, the composition layer was irradiated (irradiation amount: 500 mJ/cm$^2$) with light of a metal halide lamp (manufactured by Eye Graphics Co., Ltd.) at 55° C. under a nitrogen atmosphere to form an optically anisotropic layer T1 (film thickness: 1.4 μm) having a fixed alignment of the liquid crystal compound to thereby obtain a laminate 1 containing the polymer film 1 and the optically anisotropic layer T1.

The in-plane slow axis direction of the polymer film 1 coincided with the in-plane slow axis direction on the surface of the optically anisotropic layer T1 on the polymer film 1 side.

| Composition of composition T1 for forming optically anisotropic layer | |
|---|---|
| Rod-like liquid crystal compound (A) given below | 80 parts by mass |
| Rod-like liquid crystal compound (B) given below | 10 parts by mass |
| Rod-like liquid crystal compound (C) given below | 10 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF Japan Ltd.) | 3 parts by mass |
| Chiral agent (A) given below | 0.32 parts by mass |
| Polymer (A) given below | 0.08 parts by mass |
| Methyl isobutyl ketone | 117 parts by mass |
| Ethyl propionate | 39 parts by mass |

Rod-Like Liquid Crystal Compound (A) (Corresponding to a Mixture of Liquid Crystal Compounds Shown Below)

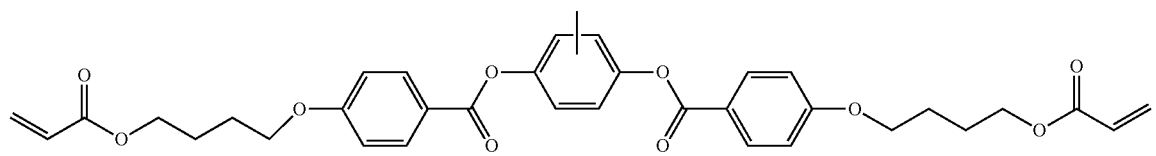

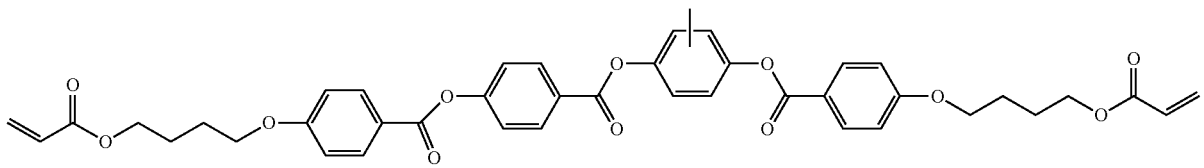

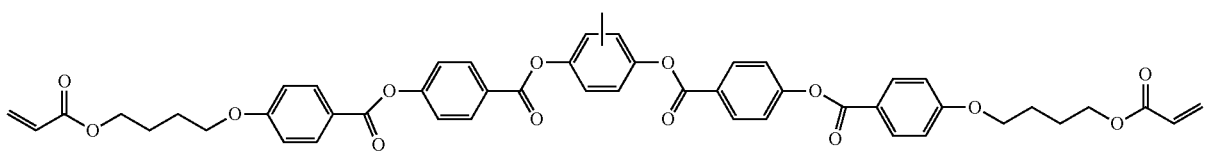

Rod-Like Liquid Crystal Compound (B)

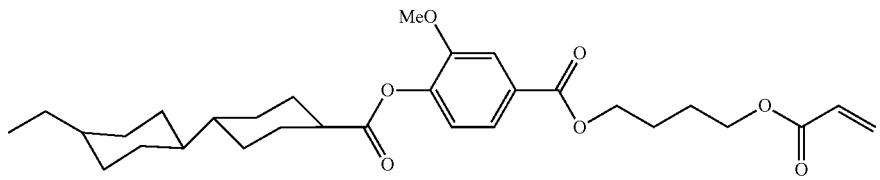 [SMILES: C=CC(=O)OCCCCOC(=O)c1ccc(OC(=O)C2CCC(C3CCC(CC)CC3)CC2)c(OC)c1]

Rod-Like Liquid Crystal Compound (C)

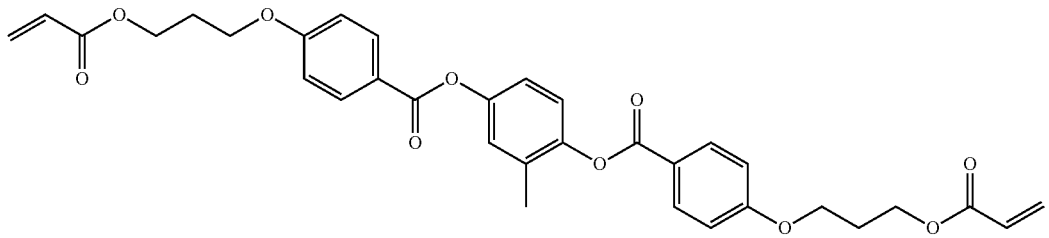 [SMILES: C=CC(=O)OCCCOc1ccc(C(=O)Oc2ccc(OC(=O)c3ccc(OCCCOC(=O)C=C)cc3)c(C)c2)cc1]

The mixture of the rod-like liquid crystal compounds (A) to (C) exhibited liquid crystallinity at 50° C.

Chiral Agent (A)

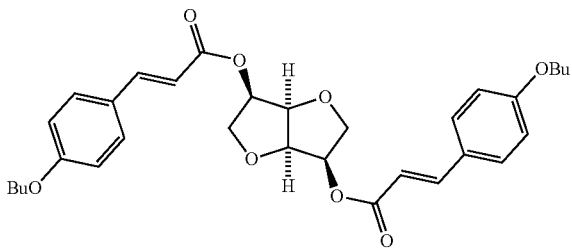

Polymer (A) (In the formula, the numerical value described in each repeating unit represents the content (% by mass) of each repeating unit with respect to all the repeating units).

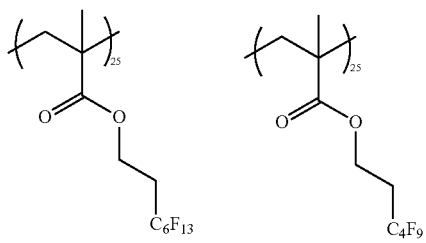

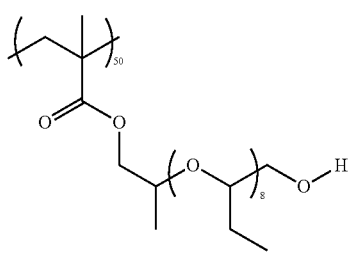

Next, a polarizer was bonded onto the surface of the laminate 1 on the polymer film 1 side through a pressure sensitive adhesive (manufactured by Lintec Corporation) to obtain a circularly polarizing plate 1.

In the circularly polarizing plate 1, the polymer film 1, the polarizer, and the optically anisotropic layer T1 were disposed in this order from the polarizer side.

In addition, in a case where the circularly polarizing plate 1 was observed from the polarizer side, the in-plane slow axis direction of the polymer film 1 was located at an angle of 10° with the absorption axis direction of the polarizer as a reference (0°). Further, in a case where the circularly polarizing plate 1 was observed from the polarizer side, the in-plane slow axis on the front surface (the surface on the polarizer side) of the optically anisotropic layer T1 was located at an angle of 10° with the absorption axis direction of the polarizer as a reference (0°), and the in-plane slow axis on the inner surface (the surface opposite to the polarizer side) of the optically anisotropic layer T1 was located at an angle of 90° with the absorption axis direction of the polarizer as a reference (0°), so that the liquid crystal compound was twisted by 80° counterclockwise in the optically anisotropic layer T1.

The rotation angle is displayed as a positive value in a counterclockwise direction and a negative value in a clockwise direction with reference to the absorption axis direction of the polarizer in a case where the circularly polarizing plate 1 is observed from the polarizer side.

Whether the twisted direction of the liquid crystal compound is clockwise or counterclockwise is determined with reference to the in-plane slow axis on surface of the front side (polarizer side) in the optically anisotropic layer, in a case where the circularly polarizing plate 1 is observed from the polarizer side.

Example 2

A laminate 2 containing a polymer film 2 and an optically anisotropic layer T2 was obtained in the same manner as in Example 1, except that the polymer film 2 was used instead of the polymer film 1, the film thickness of the optically anisotropic layer was changed from 1.4 μm to 2.1 μm, and the amount of the chiral agent used was changed from 0.32 parts by mass to 0.21 parts by mass.

A composition (1c) for forming an optically anisotropic layer containing a rod-like liquid crystal compound having the following composition was applied onto the surface of a cellulose acylate film using a Geeser coating machine to form a coating film. The rod-like liquid crystal compound (A) exhibited liquid crystallinity at 50° C. After that, both ends of the film were held, a cooling plate (9° C.) was installed on the side of the surface on which the coating film of the film was formed so that the distance from the film was 5 mm, and a heater (75° C.) was installed on the side opposite to the surface on which the coating film of the film was formed so that the distance from the film was 5 mm, followed by drying for 2 minutes.

Next, the film was heated with hot air at 60° C. for 1 minute, and irradiated with ultraviolet rays having an irradiation amount of 100 mJ/cm² using a 365 nm UV-LED while purging with nitrogen so as to have an atmosphere having an oxygen concentration of 100 ppm by volume or less. This was followed by annealing with hot air at 120° C. for 1 minute to obtain a cellulose acylate film with an optically anisotropic layer C.

The film thickness of the formed optically anisotropic layer C was 0.5 μm. The in-plane retardation Re at a wavelength of 550 nm was 0 nm, and the thickness direction retardation Rth at a wavelength of 550 nm was −70 nm. It was confirmed that the average tilt angle of the major axis direction of the rod-like liquid crystal compound with respect to the film surface was 900 and the rod-like liquid crystal compound was aligned perpendicular to the film surface.

| Composition (1c) for forming optically anisotropic layer | |
|---|---|
| Rod-like liquid crystal compound (A) given above | 100 parts by mass |
| Polymerizable monomer (A-400, manufactured by Shin-Nakamura Chemical Co., Ltd.) | 4.0 parts by mass |
| Polymerization initiator S-1 (oxime type) given below | 5.0 parts by mass |
| Photoacid generator D-1 given below | 3.0 parts by mass |
| Polymer M-1 given below | 2.0 parts by mass |
| Vertical alignment agent S01 given below | 2.0 parts by mass |
| Surfactant B-1 given below | 0.2 parts by mass |
| Methyl ethyl ketone | 42.3 parts by mass |
| Methyl isobutyl ketone | 627.5 parts by mass |

Polymer M-1

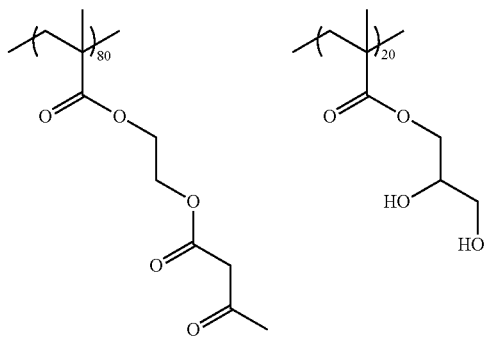

Vertical Alignment Agent S01

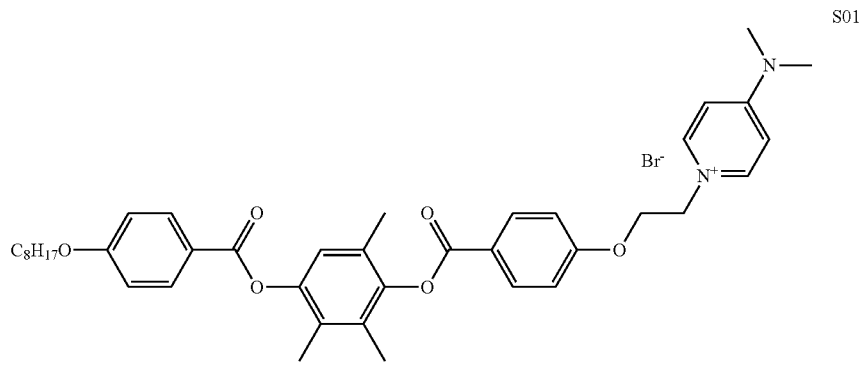

Polymerization Initiator S-1

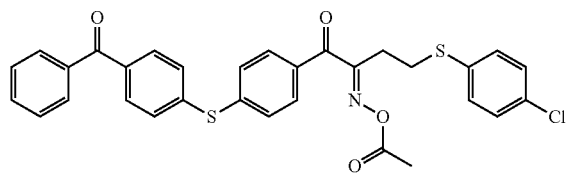

Photoacid Generator D-1

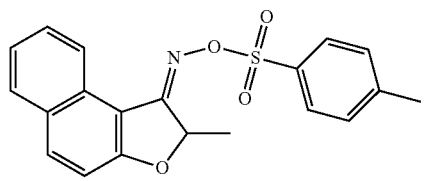

Surfactant B-1 (Weight-Average Molecular Weight: 2,200)

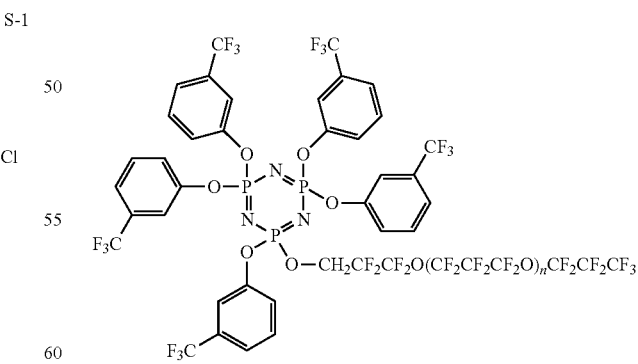

The laminate 2 and the cellulose acylate film with the optically anisotropic layer C were bonded to each other through an adhesive (manufactured by Lintec Corporation) so that the surface of the laminate 2 on the optically anisotropic layer T2 side and the surface of the cellulose acylate film with the optically anisotropic layer C on the optically anisotropic layer C side face each other. Next, the cellulose acylate film on the optically anisotropic layer C side was peeled off to expose the surface of the optically anisotropic layer C in contact with the cellulose acylate film.

A laminate 2 having the polymer film 2, the optically anisotropic layer T2, and the optically anisotropic layer C in this order was obtained by the above procedure.

Next, a polarizer was bonded onto the surface of the laminate 2 on the polymer film 2 side through a pressure sensitive adhesive (manufactured by Lintec Corporation) to obtain a circularly polarizing plate 2.

In the circularly polarizing plate 2, the polarizer, the polymer film 2, the optically anisotropic layer T2, and the optically anisotropic layer C were disposed in this order from the polarizer side.

In addition, in a case where the circularly polarizing plate 2 was observed from the polarizer side, the in-plane slow axis direction of the polymer film 2 was located at an angle of 105° with the absorption axis direction of the polarizer as a reference (0°). Further, in a case where the circularly polarizing plate 2 was observed from the polarizer side, the in-plane slow axis on the front surface (the surface on the polarizer side) of the optically anisotropic layer T2 was located at an angle of 105° with the absorption axis direction of the polarizer as a reference (0°), and the in-plane slow axis on the inner surface (the surface opposite to the polarizer side) of the optically anisotropic layer T2 was located at an angle of 185° with the absorption axis direction of the polarizer as a reference (0°), so that the liquid crystal compound was twisted by 80° counterclockwise in the optically anisotropic layer T2.

The rotation angle is displayed as a positive value in a counterclockwise direction and a negative value in a clockwise direction with reference to the absorption axis direction of the polarizer in a case where the circularly polarizing plate 2 is observed from the polarizer side.

Whether the twisted direction of the liquid crystal compound is clockwise or counterclockwise is determined with reference to the in-plane slow axis on surface of the front side (polarizer side) in the optically anisotropic layer, in a case where the circularly polarizing plate 2 is observed from the polarizer side.

Example 3

A laminate 3 having a polymer film 2, a photo-alignment film, an optically anisotropic layer T2, and an optically anisotropic layer C in this order was obtained in the same manner as in Example 2, except that the following photo-alignment film formation treatment was carried out instead of the corona treatment.

Photo-Alignment Film Formation Treatment

The following composition 1 for forming a photo-alignment film was continuously applied onto one surface of the polymer film 2 with a bar coater. After the application of the composition, the solvent was removed by drying in a heating zone at 120° C. for 1 minute to form a composition layer for a photo-alignment film having a thickness of 0.3 μm. Subsequently, a long photo-alignment film was formed by irradiation with polarized ultraviolet rays (10 mJ/cm², using an ultra-high pressure mercury lamp) while winding the film around a mirror-finished backup roll.

The irradiation direction of the polarized ultraviolet rays was adjusted so that the in-plane slow axis in the optically anisotropic layer T2 formed on the photo-alignment film was in the in-plane slow axis direction shown in Table 2 which will be described later.

In addition, the polymer A5 described in paragraphs [0095] to [0098] of WO2017/069252A was used as the following polymer A5. The polymer A5 is a polyorganosiloxane having a cinnamate group and an acryloyl group in a repeating structure.

| Composition 1 for forming photo-alignment film | |
|---|---|
| Polymer A5 | 100 parts by mass |
| NOMCORT TAB (manufactured by The Nisshin OilliO Group, Ltd.) | 15.2 parts by mass |
| Crosslinking agent (EPOLEAD GT401, manufactured by Daicel Corporation) | 122 parts by mass |
| Thermal acid generator D1 given below | 10.0 parts by mass |
| Diisopropylethylamine | 0.5 parts by mass |
| Diisobutyl ketone | 1,100 parts by mass |

NOMCORT TAB

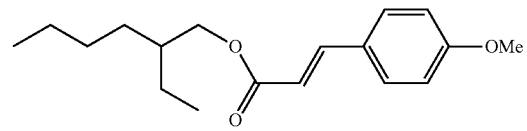

Thermal Acid Generator D1

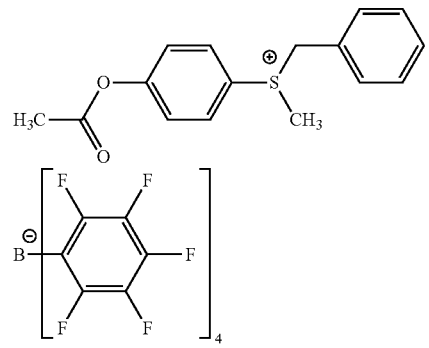

A laminate 3 having the polymer film 2, the photo-alignment film, the optically anisotropic layer T2, and the optically anisotropic layer C in this order was obtained by the above procedure.

Next, a polarizer was bonded onto the surface of the laminate 2 on the polymer film 2 side through a pressure sensitive adhesive (manufactured by Lintec Corporation) to obtain a circularly polarizing plate 3.

In the circularly polarizing plate 3, the polarizer, the polymer film 2, the optically anisotropic layer T2, and the optically anisotropic layer C were disposed in this order from the polarizer side.

In addition, in a case where the circularly polarizing plate 3 was observed from the polarizer side, the in-plane slow axis direction of the polymer film 2 was located at an angle of 105° with the absorption axis direction of the polarizer as a reference (0°). Further, in a case where the circularly polarizing plate 3 was observed from the polarizer side, the in-plane slow axis on the front surface (the surface on the polarizer side) of the optically anisotropic layer T2 was located at an angle of 105° with the absorption axis direction of the polarizer as a reference (0°), and the in-plane slow axis on the inner surface (the surface opposite to the polarizer side) of the optically anisotropic layer T2 was located at an angle of 185° with the absorption axis direction of the polarizer as a reference (0°), so that the liquid crystal compound was twisted by 80° counterclockwise in the optically anisotropic layer T2.

The rotation angle is displayed as a positive value in a counterclockwise direction and a negative value in a clockwise direction with reference to the absorption axis direction of the polarizer in a case where the circularly polarizing plate 3 is observed from the polarizer side.

Whether the twisted direction of the liquid crystal compound is clockwise or counterclockwise is determined with reference to the in-plane slow axis on surface of the front side (polarizer side) in the optically anisotropic layer, in a case where the circularly polarizing plate 3 is observed from the polarizer side.

Example 4

A photo-alignment film was formed on the polymer film 3 according to the procedure of (photo-alignment film formation treatment) described in Example 3. In this regard, the irradiation direction of the polarized ultraviolet rays was adjusted so that the in-plane slow axis in the optically anisotropic layer T3 formed on the photo-alignment film was in the in-plane slow axis direction shown in Table 2 which will be described later.

A laminate 4 containing the polymer film 3 and the optically anisotropic layer T3 was obtained in the same manner as in Example 1, except that the polymer film 3 having a photo-alignment film was used instead of the corona-treated polymer film 1, the thickness of the optically anisotropic layer was changed from 1.4 μm to 2.7 μm, the chiral agent (A) was changed to the following chiral agent (B), and the amount of the chiral agent (B) used was changed from 0.32 parts by mass to 0.08 parts by mass.

Chiral Agent (B)

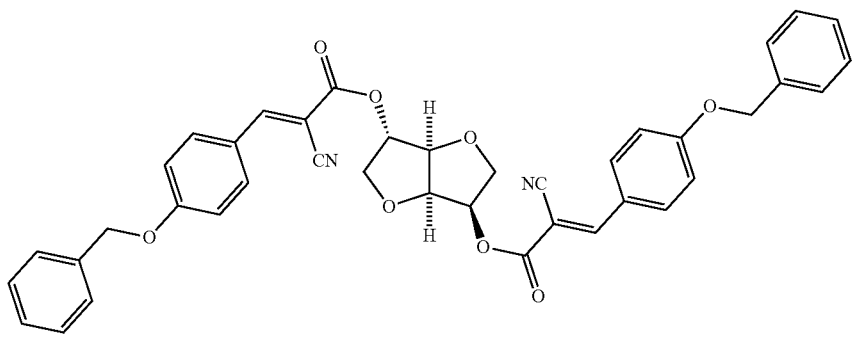 [SMILES: N#C/C(=C\c1ccc(OCc2ccccc2)cc1)C(=O)O[C@H]1CO[C@H]2[C@@H]1OC[C@H]2OC(=O)/C(C#N)=C/c1ccc(OCc2ccccc2)cc1]

The angle formed by the in-plane slow axis of the polymer film 3 and the in-plane slow axis on the surface of the optically anisotropic layer T3 on the polymer film 3 side was 50°.

Next, a polarizer was bonded onto the surface of the laminate 4 on the optically anisotropic layer T3 side through a pressure sensitive adhesive (manufactured by Lintec Corporation) to obtain a circularly polarizing plate 4.

In the circularly polarizing plate 4, the polarizer, the optically anisotropic layer T3, and the polymer film 3 were disposed in this order from the polarizer side.

In addition, in a case where the circularly polarizing plate 4 was observed from the polarizer side, the in-plane slow axis direction of the polymer film 3 was located at an angle of 0° with the absorption axis direction of the polarizer as a reference (0°). Further, in a case where the circularly polarizing plate 4 was observed from the polarizer side, the in-plane slow axis on the front surface (the surface on the polarizer side) of the optically anisotropic layer T3 was located at an angle of −90° with the absorption axis direction of the polarizer as a reference (0°), and the in-plane slow axis on the inner surface (the surface opposite to the polarizer side) of the optically anisotropic layer T3 was located at an angle of −50° with the absorption axis direction of the polarizer as a reference (0°), so that the liquid crystal compound was twisted by 40° clockwise in the optically anisotropic layer T3.

The rotation angle is displayed as a positive value in a counterclockwise direction and a negative value in a clockwise direction with reference to the absorption axis direction of the polarizer in a case where the circularly polarizing plate 4 is observed from the polarizer side.

Whether the twisted direction of the liquid crystal compound is clockwise or counterclockwise is determined with reference to the in-plane slow axis on surface of the front side (polarizer side) in the optically anisotropic layer, in a case where the circularly polarizing plate 4 is observed from the polarizer side.

Example 5

A laminate 5 containing a polymer film 4 and an optically anisotropic layer T4 was obtained in the same manner as in Example 4, except that the irradiation direction of the polarized ultraviolet rays was adjusted so that the in-plane slow axis in the optically anisotropic layer T4 formed on the photo-alignment film was in the in-plane slow axis direction shown in Table 2 which will be described later, and the polymer film 4 was used instead of the polymer film 3.

Next, a polarizer was bonded onto the surface of the laminate 5 on the optically anisotropic layer T4 side through a pressure sensitive adhesive (manufactured by Lintec Corporation) to obtain a circularly polarizing plate 5.

In the circularly polarizing plate 5, the polarizer, the optically anisotropic layer T4, and the polymer film 4 were disposed in this order from the polarizer side.

In addition, in a case where the circularly polarizing plate 5 was observed from the polarizer side, the in-plane slow axis direction of the polymer film 4 was located at an angle of −90° with the absorption axis direction of the polarizer as a reference (0°). Further, in a case where the circularly polarizing plate 4 was observed from the polarizer side, the in-plane slow axis on the front surface (the surface on the polarizer side) of the optically anisotropic layer T4 was located at an angle of 0° with the absorption axis direction of the polarizer as a reference (0°), and the in-plane slow axis on the inner surface (the surface opposite to the polarizer side) of the optically anisotropic layer T4 was located at an angle of −40° with the absorption axis direction of the polarizer as a reference (0°), so that the liquid crystal compound was twisted by 40° clockwise in the optically anisotropic layer T4.

The rotation angle is displayed as a positive value in a counterclockwise direction and a negative value in a clockwise direction with reference to the absorption axis direction of the polarizer in a case where the circularly polarizing plate 5 is observed from the polarizer side.

Whether the twisted direction of the liquid crystal compound is clockwise or counterclockwise is determined with reference to the in-plane slow axis on surface of the front side (polarizer side) in the optically anisotropic layer, in a case where the circularly polarizing plate 5 is observed from the polarizer side.

Example 6

A laminate 6 containing a polymer film 5 and an optically anisotropic layer T3 and a circularly polarizing plate 6 were obtained in the same manner as in Example 4, except that the polymer film 5 was used instead of the polymer film 3.

Example 7

A laminate 7 containing a polymer film 6 and an optically anisotropic layer T3 and a circularly polarizing plate 7 were obtained in the same manner as in Example 4, except that the polymer film 6 was used instead of the polymer film 3.

Example 8

A laminate 8 containing a polymer film 7 and an optically anisotropic layer T3 and a circularly polarizing plate 8 were obtained in the same manner as in Example 4, except that the polymer film 7 was used instead of the polymer film 3.

Example 9

A laminate 9 containing a polymer film 3 and an optically anisotropic layer T5 and a circularly polarizing plate 9 were obtained in the same manner as in Example 4, except that the rod-like liquid crystal compound (A) to the rod-like liquid crystal compound (C) (total of 100 parts by mass) in the composition T1 for forming an optically anisotropic layer were changed to the rod-like liquid crystal compound (C) (100 parts by mass). The rod-like liquid crystal compound (C) did not exhibit liquid crystallinity at 50° C.

Comparative Example 1

A photo-alignment film was formed on the polymer film 8 according to the procedure of (photo-alignment film formation treatment) described in Example 3. In this regard, the irradiation direction of the polarized ultraviolet rays was adjusted so that the in-plane slow axis in the optically anisotropic layer T6 formed on the photo-alignment film was in the in-plane slow axis direction shown in Table 2 which will be described later.

A laminate C1 containing the polymer film 8 and the optically anisotropic layer T6 was obtained in the same manner as in Example 1, except that the polymer film 8 having a photo-alignment film was used instead of the corona-treated polymer film 1, the thickness of the optically anisotropic layer was changed from 1.4 μm to 2.1 μm, and the amount of the chiral agent used was changed from 0.32 parts by mass to 0 parts by mass.

Next, a polarizer was bonded onto the surface of the laminate C1 on the polymer film 8 side through a pressure sensitive adhesive (manufactured by Lintec Corporation) to obtain a circularly polarizing plate C1.

In the circularly polarizing plate C1, the polarizer, the polymer film 8, and the optically anisotropic layer T6 were disposed in this order from the polarizer side.

In addition, in a case where the circularly polarizing plate C1 was observed from the polarizer side, the in-plane slow axis direction of the polymer film 8 was located at an angle of 15° and the in-plane slow axis direction of the optically anisotropic layer T6 was located at an angle of 75° with the absorption axis direction of the polarizer as a reference (0°). The rotation angle is displayed as a positive value in a counterclockwise direction and a negative value in a clockwise direction with reference to the absorption axis direction of the polarizer in a case where the circularly polarizing plate C1 is observed from the polarizer side.

Comparative Example 2

A laminate C2 and a circularly polarizing plate C2 were obtained in the same manner as in Example 1, except that the polymer film 9 was used instead of the polymer film 1.
Evaluation Method The evaluation method of each evaluation item will be described.
Curl Since it is preferable that the curl of the circularly polarizing plate of each of Examples and Comparative Examples is small from the viewpoint of improving the handleability at the time of production, the curl was evaluated.

The curl value of the circularly polarizing plate of each of Examples and Comparative Examples can be measured according to the measuring method (ANSI/ASC PH1.29-1985, Method-A) specified by the American National Standards Institute. The specific procedure will be described below.

A circularly polarizing plate was cut into a size of 35 mm in a width direction and 2 mm in a longitudinal direction, and then placed on a curl plate. The circularly polarizing plate placed on the curl plate was subjected to humidity control for 6 hours in an environment of a temperature of 25° C. and a relative humidity of 80%, and the curl value was read. The curl value is expressed by the curvature radius (cm). The smaller the curvature radius, the worse the transportability.

Edge curl was evaluated based on the following standards. Based on the following standards, A to C are practically acceptable levels.

A: (absolute value of curl value)≥30 cm
B: 30 cm>(absolute value of curl value)≥20 cm
C: 20 cm>(absolute value of curl value)
Wrinkling The wrinkling was evaluated for the circularly polarizing plate of each of Examples and Comparative Examples according to the following standards.

A: There is no wrinkling, or slight wrinkling which is not visible as optical unevenness in a case of being observed with Schaukasten (display case).
B: Coating optical unevenness due to wrinkling is visible.

Aligning Properties

The optically anisotropic layer in the obtained phase difference plate was observed with a polarization microscope in a crossed nicols state and the aligning properties of the optically anisotropic layer were evaluated according to the following standards.

A: No optical defects are observed.
B: Slight optical defects are observed, but there is no problem in practical use.
C: Many optical defects are observed, and there is a problem in practical use.

Tint Difference

The tint difference between the front direction and the oblique direction of the display device using the circularly polarizing plate of each of Examples and Comparative Examples was evaluated according to the following procedure.

The OLED55B8PJA (manufactured by LG Electronics Co., Ltd.) equipped with an organic EL panel (organic EL display element) was disassembled, and a touch panel with a circularly polarizing plate was peeled off from the organic EL display device. The circularly polarizing plate prepared above was bonded to the surface of the display device from which the touch panel with a circularly polarizing plate was peeled off so as not to allow air to enter, thereby preparing an organic EL display device. The prepared organic EL display device was displayed in black, and the reflected light in a case where a fluorescent lamp was projected from the front and from a polar angle of 60° was observed under bright light. The display quality of the front and the polar angle of 60° was evaluated based on the following standards.

A: The change of tint is not visible at all, or even in a case where the change of tint is visible, it is slight.
B: The tint difference is slightly visible, but the reflected light is small and there is no problem in use.
C: The tint difference is visible and there is a lot of reflected light, which is unacceptable.

Tint Unevenness

Since it is preferable that the above-mentioned degree of the tint difference is the same for each produced display device at the time of producing an image display apparatus, evaluation of tint unevenness for each display device using the circularly polarizing plate of each of Examples and Comparative Examples was carried out.

Twenty organic EL display devices were prepared by the same method as the above-mentioned tint difference evaluation procedure, and evaluation of the tint difference was carried out for each of the prepared organic EL display devices. The individual difference for each organic EL display device in a case where evaluation of the tint difference was carried out was evaluated based on the following standards. In terms of production, evaluation of A or B is preferable.

A: The individual difference is not visible at all, or even in a case where the individual difference is visible, it is slight.
B: The individual difference is slightly visible, but the reflected light is small and there is no problem in use.
C: The individual difference is visible and there is a lot of reflected light, which is unacceptable.

Results

Table 2 shows the evaluation results of curl, wrinkling, aligning properties, tint difference, and tint unevenness.

In the table, "Angle with respect to absorption axis of polarizer" represents an angle in an in-plane slow axis direction on the front surface of each layer with respect to the absorption axis of the polarizer in a case where the circularly polarizing plate of each of Examples and Comparative Examples is viewed from the polarizer side. In addition, the angle is displayed as a positive value in a counterclockwise direction and a negative value in a clockwise direction with reference to the absorption axis of the polarizer.

In the table, "Twisted angle of optically anisotropic layer T" is the same as the twisted angle shown in Table 2, and represents that the in-plane slow axis direction is twisted toward the inner surface of each layer in a case where the circularly polarizing plate of each of Examples and Comparative Examples is viewed from the polarizer side, from the "Angle with respect to absorption axis of polarizer". In addition, the angle is displayed as a positive value in a counterclockwise direction and a negative value in a clockwise direction with reference to the absorption axis of the polarizer.

TABLE 2

| | | | Second layer | | | | | | |
|---|---|---|---|---|---|---|---|---|---|
| | First layer Type | Type | Angle (°) with respect to absorption axis of polarizer | Type of chiral agent | Twisted angle (°) of optically anisotropic layer T | Rth (nm) of polymer film | Film thickness (μm) | Amount (parts by mass) of chiral agent | Δnd (nm) |
| Example 1 | Polarizer | Polymer film 1 | 10 | — | — | −85 | — | — | — |
| Example 2 | Polarizer | Polymer film 2 | 105 | — | — | −85 | — | — | — |
| Example 3 | Polarizer | Polymer film 2 | 105 | — | — | −85 | — | — | — |
| Example 4 | Polarizer | Optically anisotropic layer T3 | −90 | B | −40 | — | 2.7 | 0.08 | 347 |
| Example 5 | Polarizer | Optically anisotropic layer T4 | 0 | B | −40 | — | 2.7 | 0.08 | 347 |
| Example 6 | Polarizer | Optically anisotropic layer T3 | −90 | B | −40 | — | 2.7 | 0.08 | 347 |

TABLE 2-continued

| | | | | | | | | |
|---|---|---|---|---|---|---|---|---|
| Example 7 | Polarizer | Optically anisotropic layer T3 | −90 | B | −40 | — | 2.7 | 0.08 | 347 |
| Example 8 | Polarizer | Optically anisotropic layer T3 | −90 | B | −40 | — | 2.7 | 0.08 | 347 |
| Example 9 | Polarizer | Optically anisotropic layer T5 | −90 | B | −40 | — | 2.7 | 0.08 | 347 |
| Comparative Example 1 | Polarizer | Polymer film 8 | 15 | — | — | 65 | — | — | — |
| Comparative Example 2 | Polarizer | Polymer film 9 | 10 | — | — | 85 | — | — | — |

| | Third layer | | | | | | | |
|---|---|---|---|---|---|---|---|---|
| | Photo-alignment film | Type | Angle (°) with respect to absorption axis of polarizer | Type of chiral agent | Twisted angle (°) of optically anisotropic layer T | Rth (nm) of polymer film | Film thickness (μm) | Amount (parts by mass) of chiral agent | Δnd (nm) |
| Example 1 | — | Optically anisotropic layer T1 | 10 | A | 80 | — | 1.4 | 0.32 | 180 |
| Example 2 | — | Optically anisotropic layer T2 | 105 | A | 80 | — | 2.1 | 0.21 | 260 |
| Example 3 | Present | Optically anisotropic layer T2 | 105 | A | 80 | — | 2.1 | 0.21 | 260 |
| Example 4 | Present | Polymer film 3 | 0 | — | — | −49 | — | — | — |
| Example 5 | Present | Polymer film 4 | −90 | — | — | −49 | — | — | — |
| Example 6 | Present | Polymer film 5 | 0 | — | — | −49 | — | — | — |
| Example 7 | Present | Polymer film 6 | 0 | — | — | −49 | — | — | — |
| Example 8 | Present | Polymer film 7 | 0 | — | — | −49 | — | — | — |
| Example 9 | Present | Polymer film 3 | 0 | — | — | −49 | — | — | — |
| Comparative Example 1 | Present | Optically anisotropic layer T6 | 75 | — | 0 | — | 2.1 | 0.00 | 260 |
| Comparative Example 2 | Present | Optically anisotropic layer T1 | 10 | A | 80 | — | 1.4 | 0.32 | 180 |

| | Fourth layer Type | Evaluation | | | | |
|---|---|---|---|---|---|---|
| | | Curl | Wrinkling | Aligning properties | Tint difference | Tint unevenness |
| Example 1 | — | A | A | A | B | B |
| Example 2 | Optically anisotropic layer C | A | A | A | A | B |
| Example 3 | Optically anisotropic layer C | A | A | A | A | A |
| Example 4 | — | B | A | A | B | A |
| Example 5 | — | B | A | A | B | A |
| Example 6 | — | B | B | A | B | A |
| Example 7 | — | B | A | A | B | A |
| Example 8 | — | B | A | A | B | A |
| Example 9 | — | B | A | B | B | A |
| Comparative Example 1 | — | C | A | A | C | A |
| Comparative Example 2 | — | A | A | A | C | A |

From the results in Table 2, it was confirmed that the tint difference between the front direction and the oblique direction was small in a case where the circularly polarizing plate using the phase difference plate according to the embodiment of the present invention was applied to an image display apparatus.

From the comparison between Examples 1 and 2 and the other Examples, it was confirmed that the inclusion of a photo-alignment film between the polymer film and the optically anisotropic layer T suppressed tint unevenness.

From the comparison between Example 9 and the other Examples, it was confirmed that the aligning properties were excellent in a case where the liquid crystal compound contained in the optically anisotropic layer T exhibited liquid crystallinity at 50° C.

From the comparison between Example 6 and the other Examples, it was confirmed that wrinkling on the phase difference plate was suppressed in a case where the glass transition temperature of the polymer film was 110° C. or higher.

From the comparison between Examples 2 and 3 and the other Examples, it was confirmed that the tint difference between the front direction and the oblique direction upon application of the circularly polarizing plate to an image display apparatus was small in a case where the circularly polarizing plate had the optically anisotropic layer C.

EXPLANATION OF REFERENCES 10a, 10b, 10c: phase difference plate
12a, 12b, 12c: first optically anisotropic layer
14a, 14b, 14c: second optically anisotropic layer
20: polarizer
100a, 100b, 100c: circularly polarizing plate

What is claimed is:

1. A phase difference plate comprising:
a first optically anisotropic layer; and
a second optically anisotropic layer,
wherein the first optically anisotropic layer is a polymer film,
an in-plane retardation of the first optically anisotropic layer at a wavelength of 550 nm is 151 to 211 nm,
a thickness direction retardation of the first optically anisotropic layer at a wavelength of 550 nm is −150 to −30 nm,
the second optically anisotropic layer is a layer formed by fixing a liquid crystal compound twist-aligned with a thickness direction as a helical axis,
the second optically anisotropic layer satisfies a relationship of Expression (1-A), $$142 \text{ nm} \leq \Delta nd \leq 202 \text{ nm} \quad \text{Expression (1-A)}$$

in Expression (1-A), $\Delta n$ represents a refractive index anisotropy of the second optically anisotropic layer at a wavelength of 550 nm, and d represents a thickness of the second optically anisotropic layer,
wherein an in-plane slow axis of the first optically anisotropic layer is parallel to an in-plane slow axis on a surface of the second optically anisotropic layer on a first optically anisotropic layer side, and
wherein a twisted angle of the liquid crystal compound in the second optically anisotropic layer is within a range of 81°±10°.

2. The phase difference plate according to claim 1, further comprising:
a photo-alignment film between the first optically anisotropic layer and the second optically anisotropic layer.

3. The phase difference plate according to claim 2,
wherein the polymer film contains a polymer having at least one selected from the group consisting of a repeating unit derived from a styrene derivative and a repeating unit having a fluorene structure.

4. The phase difference plate according to claim 2,
wherein the liquid crystal compound exhibits liquid crystallinity at 50° C.

5. The phase difference plate according to claim 2,
wherein a glass transition temperature of the first optically anisotropic layer is 110° C. or higher.

6. The phase difference plate according to claim 1,
wherein the polymer film contains a polymer having at least one selected from the group consisting of a repeating unit derived from a styrene derivative and a repeating unit having a fluorene structure.

7. The phase difference plate according to claim 6,
wherein the liquid crystal compound exhibits liquid crystallinity at 50° C.

8. The phase difference plate according to claim 6,
wherein a glass transition temperature of the first optically anisotropic layer is 110° C. or higher.

9. The phase difference plate according to claim 1,
wherein the liquid crystal compound exhibits liquid crystallinity at 50° C.

10. The phase difference plate according to claim 9,
wherein a glass transition temperature of the first optically anisotropic layer is 110° C. or higher.

11. The phase difference plate according to claim 1,
wherein a glass transition temperature of the first optically anisotropic layer is 110° C. or higher.

12. The phase difference plate according to claim 1, wherein an in-plane slow axis of the first optically anisotropic layer is orthogonal to an in-plane slow axis on a surface of the second optically anisotropic layer on a first optically anisotropic layer side, the twisted angle of the second optically anisotropic layer is within a range of 59°+/−10°, the in-plane retardation of the first optically anisotropic layer at a wavelength of 550 nm is 158 to 218 nm.

13. The phase difference plate according to claim 1, wherein an angle formed by an in-plane slow axis of the first optically anisotropic layer and an in-plane slow axis on a surface of the second optically anisotropic layer on a first optically anisotropic layer side is within a range of 30° to 70°, the twisted angle of the second optically anisotropic layer is within a range of 40°+/−20°, the in-plane retardation of the first optically anisotropic layer at a wavelength of 550 nm is 67.5 to 127.5 nm.

14. The phase difference plate according to claim 1, further comprising:
a third optically anisotropic layer having a thickness direction retardation of −100 to −35 nm at a wavelength of 550 nm.

15. A circularly polarizing plate comprising:
the phase difference plate according to claim 1; and
a polarizer.

16. An image display apparatus comprising:
the circularly polarizing plate according to claim 15.

17. An image display apparatus comprising:
the phase difference plate according to claim 1.

* * * * *